United States Patent
Takushima et al.

(10) Patent No.: US 10,222,199 B2
(45) Date of Patent: Mar. 5, 2019

(54) DISPLACEMENT SENSOR, DISPLACEMENT DETECTION APPARATUS, AND DISPLACEMENT DETECTION METHOD

(71) Applicant: Mitsubishi Electric Corporation, Tokyo (JP)

(72) Inventors: Shigeru Takushima, Tokyo (JP); Hiroyuki Kawano, Tokyo (JP); Takashi Yuzawa, Tokyo (JP); Makito Seki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/522,115

(22) PCT Filed: Dec. 2, 2014

(86) PCT No.: PCT/JP2014/081888
§ 371 (c)(1),
(2) Date: Apr. 26, 2017

(87) PCT Pub. No.: WO2016/088203
PCT Pub. Date: Jun. 9, 2016

(65) Prior Publication Data
US 2017/0322019 A1 Nov. 9, 2017

(51) Int. Cl.
*G01B 11/14* (2006.01)
*G01S 17/08* (2006.01)
*G01C 3/08* (2006.01)

(52) U.S. Cl.
CPC .............. *G01B 11/14* (2013.01); *G01C 3/08* (2013.01); *G01S 17/08* (2013.01)

(58) Field of Classification Search
CPC ........ G01B 11/14; G01B 11/026; G01B 5/08; G01B 11/02; G01B 11/24; G01B 11/00; G01S 17/08; G01D 5/30
See application file for complete search history.

(56) References Cited

U.S. PATENT DOCUMENTS

| 4,548,504 A | 10/1985 | Morander |
| 4,645,347 A * | 2/1987 | Rioux .................... G01C 11/00 250/208.1 |

(Continued)

FOREIGN PATENT DOCUMENTS

| EP | 0 370 770 A1 | 5/1990 |
| JP | 58-052514 A | 3/1983 |

(Continued)

OTHER PUBLICATIONS

International Search Report of PCT/JP2014/081888 dated Mar. 10, 2015 [PCT/ISA/210].

*Primary Examiner* — Sang H Nguyen
(74) *Attorney, Agent, or Firm* — Sughrue Mion, PLLC; Richard C. Turner

(57) ABSTRACT

A displacement sensor includes: a projection unit projecting emitted light toward a detection target surface of a detection target object; an objective optical system converging the emitted light toward the detection target surface and admitting reflected light resulting from diffuse reflection of the emitted light by the detection target surface; a baffle plate having openings each allowing one of portions of transmitted light resulting from the admission by the objective optical system to pass therethrough; an image capture unit capturing an image; image forming optical systems allowing each of the portions of the transmitted light resulting from the admission by the objective optical system to form an image on the image capture unit; and a signal processing unit calculating a distance from the detection target surface based on a luminance centroid of each of spots captured by the image capture unit.

13 Claims, 19 Drawing Sheets

(56) References Cited

U.S. PATENT DOCUMENTS

| | | | | |
|---|---|---|---|---|
| 4,874,246 A * | 10/1989 | Den Boef | | G01B 11/026 356/624 |
| 4,897,536 A * | 1/1990 | Miyoshi | | G01B 11/00 250/201.6 |
| 4,999,014 A | 3/1991 | Gold et al. | | |
| 5,075,561 A * | 12/1991 | Rioux | | G01B 11/24 250/201.8 |
| 5,168,327 A * | 12/1992 | Yamawaki | | G01B 11/24 250/201.8 |
| 5,177,556 A * | 1/1993 | Rioux | | G01B 11/24 356/326 |
| 5,453,962 A * | 9/1995 | Fujita | | G11B 7/00718 369/112.12 |
| 7,394,552 B2 * | 7/2008 | Spink | | G01B 11/02 250/201.3 |
| 2001/0001578 A1 * | 5/2001 | Blais | | G01C 3/14 356/601 |
| 2003/0179387 A1 * | 9/2003 | Uno | | G01B 11/026 356/624 |
| 2008/0266576 A1 * | 10/2008 | Iwamoto | | G01D 5/30 356/614 |
| 2012/0246899 A1 | 10/2012 | Yamada et al. | | |
| 2013/0301042 A1 | 11/2013 | Urano et al. | | |
| 2014/0293292 A1 * | 10/2014 | Girard | | G01B 5/28 356/600 |
| 2014/0336479 A1 * | 11/2014 | Ando | | A61B 5/4041 600/310 |

FOREIGN PATENT DOCUMENTS

| | | |
|---|---|---|
| JP | 63-142212 A | 6/1988 |
| JP | 63-153419 A | 6/1988 |
| JP | 64-075906 A | 3/1989 |
| JP | 02-184715 A | 7/1990 |
| JP | 02-187619 A | 7/1990 |
| JP | 03-017505 A | 1/1991 |
| JP | 06-129840 A | 5/1994 |
| JP | 06-167305 A | 6/1994 |
| JP | 06-072775 B2 | 9/1994 |
| JP | 2002-148507 A | 5/2002 |
| JP | 2002-323316 A | 11/2002 |
| JP | 2012-137350 A | 7/2012 |
| JP | 2012-163910 A | 8/2012 |
| JP | 2012-194085 A | 10/2012 |
| JP | 2014-509730 A | 4/2014 |
| JP | 2015-190885 A | 11/2015 |

* cited by examiner

DISPLACEMENT SENSOR, DISPLACEMENT DETECTION APPARATUS, AND DISPLACEMENT DETECTION METHOD

CROSS REFERENCE TO RELATED APPLICATIONS

This application is a National Stage of International Application No. PCT/JP2014/081888, filed Dec. 2, 2014, the contents of which are incorporated herein by reference in its entirety.

FIELD

The present invention relates to a displacement sensor that calculates the distance from a detection target surface of a detection target object, a displacement detection apparatus, and a displacement detection method.

BACKGROUND

In general, before machining is performed on a workpiece using a machining apparatus that is exemplified by an electrical discharge machining apparatus and a laser machining apparatus with high accuracy, a setup process is performed in which a reference surface of the workpiece is aligned relative to the scan axis of the machining apparatus with high accuracy. In the setup process, the workpiece is fixed to a scan unit of the machining apparatus with a fixture, a dial gauge is pressed against the reference surface of the workpiece, and the position of the workpiece is adjusted manually such that the value of the dial gauge does not change when the scan axis corresponding to the reference surface of the workpiece is moved. Such a manual setup process poses a problem in that it takes time and causes variation in the result of the alignment in a manner depending on the skill of operators.

In order to reduce the work time and the variation due to operators, there is a method in which a measurement sensor is attached to the machining apparatus and the setup is performed automatically. Such a measurement sensor includes, in addition to contact type sensors, an optical sensor capable of measuring in a noncontact manner. An optical sensor emits a laser beam toward a top surface of the workpiece and detects the reflected light so as to measure the position of the detected surface in a noncontact manner. Hence, such an optical sensor offers an advantage of enabling measurement of a narrow reference hole and a soft workpiece.

Patent Literature 1 to Patent Literature 3 listed below are known as related techniques.

CITATION LIST

Patent Literature

Patent Literature 1: Japanese Examined Patent Application Publication No. H06-72775
Patent Literature 2: Japanese Patent Application Laid-Open No. H02-184715
Patent Literature 3: Japanese Patent Application Laid-Open No. H06-167305

SUMMARY

Technical Problem

In the technique described in Patent Literature 1, photoelectric conversion elements 2 to 9 are arranged radially with a beam spot 19 at the center (see FIG. 1 of Patent Literature 1), which increases the apparatus in size.

In the technique described in Patent Literature 2, a position sensing detector 32 senses parallel rays of alight 24 (see FIG. 1a of Patent Literature 2); thus, the position sensing detector 32 need to be larger than the parallel rays of the light 24, which increases the apparatus in size.

In the technique described in Patent Literature 3, two PSDs (Position Sensitive Devices) detect light reflected from a measurement target object 100, which increases the apparatus in size.

The present invention has been achieved in view of the above, and an object of the present invention is to provide a displacement sensor that enables a reduction of an apparatus in size.

Solution to Problem

In order to solve the above problems and achieve the object, an aspect of the present invention is a displacement sensor including: a projection unit to project emitted light toward a detection target surface of a detection target object; an objective optical system to converge the emitted light toward the detection target surface and admit reflected light resulting from diffuse reflection of the emitted light by the detection target surface; a baffle plate having a plurality of openings that each allow one of a plurality of portions of transmitted light resulting from the admission by the objective optical system to pass through the opening; an image capture unit to capture an image; a plurality of image forming optical systems to allow each of the portions of the transmitted light resulting from the admission by the objective optical system to form an image on the image capture unit; and a signal processing unit to calculate a distance from the detection target surface on a basis of a luminance centroid of each of a plurality of spots captured by the image capture unit.

Advantageous Effects of Invention

A displacement sensor, a displacement detection apparatus, and a displacement detection method according to the present invention produce an effect of enabling a reduction of the apparatus in size.

DESCRIPTION OF EMBODIMENTS

A displacement sensor, a displacement detection apparatus, and a displacement detection method according to embodiments of the present invention will be described below in detail with reference to the drawings. The present invention is not limited to the embodiments.

First Embodiment

Figure 1:
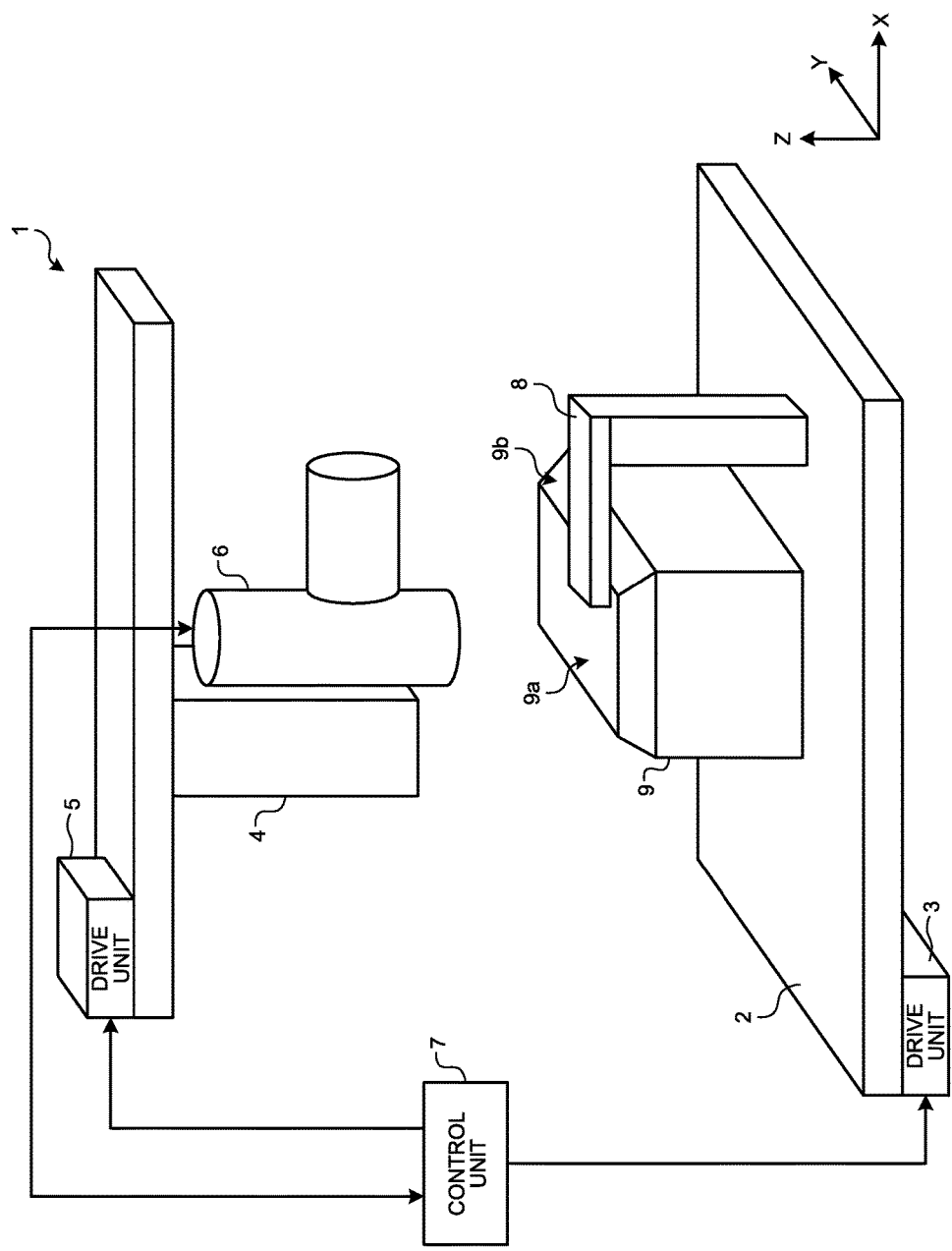
FIG. 1 is a diagram illustrating a displacement detection apparatus according to a first embodiment.

FIG. 1 is a diagram illustrating a displacement detection apparatus according to a first embodiment. A displacement detection apparatus 1 is a machining apparatus that machines a detection target object 9, which is also a workpiece. A machining apparatus is exemplified by an electrical discharge machining apparatus or a laser machining apparatus.

The displacement detection apparatus 1 includes a scan unit 2, on which the detection target object 9 is to be mounted; a drive unit 3, which drives the scan unit 2 in an X direction, a Y direction, and a Z direction; a machining head 4, which machines the detection target object 9; a drive unit 5, which drives the machining head 4 in the X direction, the Y direction, and the Z direction; a displacement sensor 6, which is attached to the side face of the machining head 4; and a control unit 7, which controls the drive units 3 and 5 and the displacement sensor 6.

In the first embodiment, the X direction, the Y direction, and the Z direction are orthogonal to each other. An X-Y plane is horizontal, and the Z direction is vertical. Hereinafter, the X direction may be referred to as a +X direction, the direction opposite to the X direction may be referred to as a −X direction, the Y direction may be referred to as a +Y direction, the direction opposite to the Y direction may be referred to as a −Y direction, the Z direction may be referred to as a +Z direction, and the direction opposite to the Z direction may be referred to as a −Z direction.

The detection target object 9 is fixed to the scan unit 2 with a fixture 8. The surface of the detection target object 9 in the Z direction, that is, its top surface, is a detection target surface 9a. In the first embodiment, the detection target surface 9a is approximately parallel with the X-Y plane. The displacement sensor 6 is used for obtaining the inclination of the detection target surface 9a with respect to the X-Y plane, that is, an attachment error, by measuring the height of the detection target surface 9a at a plurality of points. The plurality of points is exemplified by three points. Boundary portions between four side faces of the detection target object 9 and four sides of the detection target surface 9a are chamfered so that a chamfer surface 9b is formed.

The displacement sensor 6 emits light toward the detection target surface 9a and calculates the distance between the displacement sensor 6 and the detection target surface 9a on the basis of the reflected light from the detection target surface 9a. The control unit 7 can calculate the height of the detection target object 9 by subtracting the distance between the displacement sensor 6 and the detection target surface 9a from the distance between the scan unit 2 and the displacement sensor 6.

Figure 2:
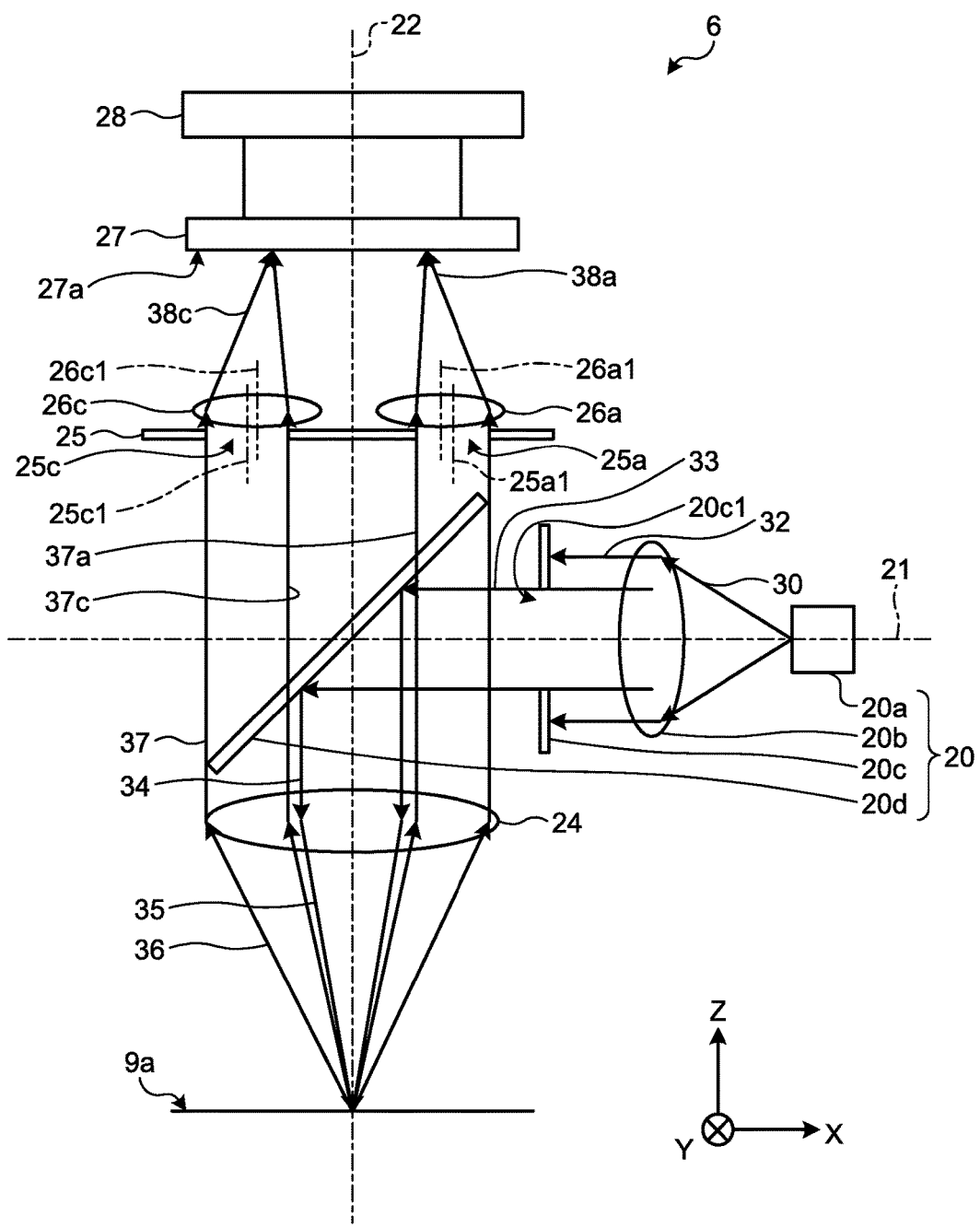
FIG. 2 is a diagram illustrating the configuration of a displacement sensor according to the first embodiment.

FIG. 2 is a diagram illustrating the configuration of the displacement sensor according to the first embodiment. FIG. 2 is a diagram illustrating the configuration of the displacement sensor 6 when viewed in the Y direction.

The displacement sensor 6 includes a projection unit 20, which projects emitted light 35 toward the detection target surface 9a in a direction perpendicular to the detection target surface 9a, and an objective optical system 24, which converges the emitted light 35 toward the detection target surface 9a and converts reflected light 36 resulting from diffuse reflection of the emitted light 35 by the detection target surface 9a into parallel light 37.

The displacement sensor 6 also includes a baffle plate 25 having openings 25a, 25b, 25c, and 25d, which will be described hereinafter and each of which allows one of the portions of the parallel light 37 to pass therethrough; an image capture unit 27, which captures an image; and image forming optical systems 26a, 26b, 26c, and 26d, which will be described hereinafter and allow the portions of the parallel light 37 to form images on the image capture unit 27.

The displacement sensor 6 also includes a signal processing unit 28, which calculates the distance from the detection target surface 9a on the basis of the luminance centroid of each of the spots captured by the image capture unit 27.

The luminance centroid of a spot refers to the centroid with each pixel in the spot weighted with luminance.

Figure 3:
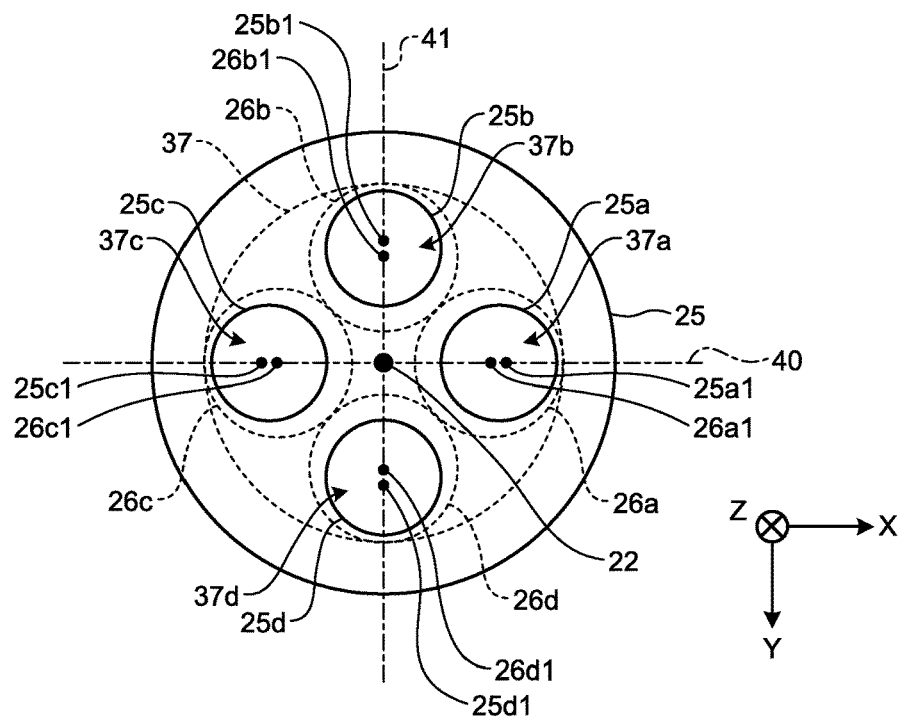
FIG. 3 is a diagram illustrating a baffle plate of the displacement sensor according to the first embodiment.

FIG. 3 is a diagram illustrating the baffle plate of the displacement sensor according to the first embodiment. FIG. 3 is a diagram illustrating the baffle plate 25 when viewed in the Z direction. The baffle plate 25 has the openings 25a, 25b, 25c, and 25d. A line 40, which connects the center of the opening 25a and the center of the opening 25c, extends along the X direction, and a line 41, which connects the center of the opening 25b and the center of the opening 25d, extends along the Y direction. The openings 25a, 25b, 25c, and 25d are formed equidistant from a reference axis 22, which will be described hereinafter. The image forming optical systems 26a, 26b, 26c, and 26d are formed at the openings 25a, 25b, 25c, and 25d, respectively, in the Z direction.

With reference again to FIG. 2, the projection unit 20 includes a light source 20a, which emits light 30. The light source 20a is exemplified by a laser diode. The optical axis of the light 30 is an axis 21, which extends along the X direction. Here, an optical axis is an axis that indicates the traveling direction of an imaginary ray of light that represents the entire emitted luminous flux or the entire received luminous flux and it is an axis that indicates the traveling direction of the entire luminous flux.

The projection unit 20 also includes a projection optical system 20b, which converts the light 30 into parallel light 32. In the first embodiment, the projection optical system 20b is one lens, although it may be a combination of lenses.

The displacement sensor 6 may have a configuration that excludes the projection optical system 20b so that the light 30 is not converted into parallel light. However, from viewpoints of, for example, ease of design, ease of assembly, and height measuring accuracy, it is desirable that the displacement sensor 6 include the projection optical system 20b so that the light 30 is converted into the parallel light 32.

The projection unit 20 includes a projection aperture plate 20c having an opening 20c1, which allows light 33 that is a part of the parallel light 32 to pass therethrough. With the displacement sensor 6, it is possible to adjust the diameter of a spot at the detection target surface 9a by adjusting the diameter of the opening 20c1.

The projection unit 20 includes a beam splitter 20d, which reflects the light 33 that has passed through the opening 20c1 toward the detection target surface 9a. The optical axis of light 34, which results from the reflection by the beam splitter 20d and travels toward the detection target surface 9a, is the reference axis 22, which extends in the Z direction. That is, the reference axis 22 extends in the vertical direction. The angle formed by the beam splitter 20d and the X-Z plane is 90 degrees.

The light 34 enters the objective optical system 24. In the first embodiment, the objective optical system 24 is one lens, although it may be a combination of lenses. The emitted light 35, which results from the convergence of the light 34 by the objective optical system 24, illuminates the detection target surface 9a. The optical axis of the emitted light 35 is the reference axis 22. The emitted light 35 is diffusely reflected by the detection target surface 9a. In general, the detection target surface 9a is a rough surface before the machining so that the emitted light 35 is diffusely reflected.

The reflected light 36, which results from the diffuse reflection of the emitted light 35 by the detection target surface 9a, enters the objective optical system 24. The optical axis of the reflected light 36 is the reference axis 22. The objective optical system 24 converts the reflected light 36 into the parallel light 37. The optical axis of the parallel light 37 is the reference axis 22.

Here, there is no need for the objective optical system 24 to convert the reflected light 36 into the parallel light 37 exactly, and it is satisfactory if light for use in height measurement is acquired. However, from viewpoints of, for example, ease of design, ease of assembly, and height measuring accuracy, it is desirable that the objective optical system 24 convert the reflected light 36 into the parallel light 37.

The parallel light 37 passes through the beam splitter 20d and illuminates the baffle plate 25. The baffle plate 25 is placed so as to be parallel with the X-Y plane. That is, the baffle plate 25 is placed so as to be perpendicular to the reference axis 22.

With reference again to FIG. 3, the parallel light 37 illuminates a region including the openings 25a, 25b, 25c, and 25d. The openings 25a, 25b, 25c, and 25d allow rays of light 37a, 37b, 37c, and 37d, which are portions of the parallel light 37, to pass therethrough, respectively. Rays of image forming light 38a, 38b, 38c, and 38d resulting from passage of the rays of light 37a, 37b, 37c, and 37d through the image forming optical systems 26a, 26b, 26c, and 26d, respectively, form images on an image capture surface 27 of the image capture unit 27. In the first embodiment, each of the image forming optical systems 26a, 26b, 26c, and 26d is one lens, although it may be a combination of lenses. Alternatively, the image forming optical systems 26a, 26b, 26c, and 26d may be triangular prisms.

As illustrated in FIG. 2, the image forming optical system 26a has a central axis 26a1, which is located closer to the reference axis 22 than a central axis 25a1 of the opening 25a. Thus, as illustrated in FIG. 2, the position at which the ray of the image forming light 38a forms an image on the image capture surface 27a of the image capture unit 27 is closer to the reference axis 22 than the central axis 25a1 of the opening 25a.

Similarly, the image forming optical system 26c has a central axis 26c1, which is located closer to the reference axis 22 than a central axis 25c1 of the opening 25c. Thus, as illustrated in FIG. 2, the position at which the ray of the image forming light 38c forms an image on the image capture surface of the image capture unit 27 is closer to the reference axis 22 than the central axis 25c1 of the opening 25c.

As illustrated in FIG. 3, the image forming optical systems 26b and 26d also have central axes 26b1 and 26d1, which are located closer to the reference axis 22 than central axes 25b1 and 25d1 of the openings 25b and 25d. Thus, the positions at which the rays of the image forming light that have passed through the image forming optical systems 26b and 26d form images on the image capture surface of the image capture unit 27 are closer to the reference axis 22 than the central axes 25b1 and 25d1 of the openings 25b and 25d, respectively.

Because the objective optical system 24 converts the reflected light 36 into the parallel light 37 in this manner, the displacement sensor 6 can reduce its width in the X direction and the Y direction and thus can reduce its size.

Additionally, the size of the image capture unit 27 can be reduced, and thus, the displacement sensor 6 can reduce costs.

Figure 4:
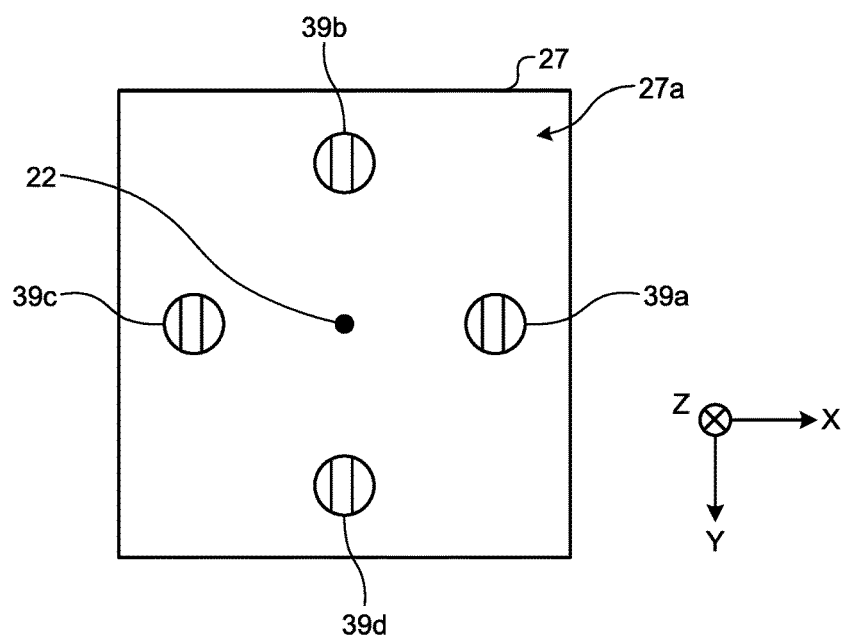
FIG. 4 is a diagram illustrating an image capture surface of an image capture unit of the displacement sensor according to the first embodiment.

FIG. 4 is a diagram illustrating the image capture surface of the image capture unit of the displacement sensor according to the first embodiment. FIG. 4 is a diagram illustrating the image capture surface of the image capture unit 27 when viewed in the Z direction. The image forming optical systems 26a, 26b, 26c, and 26d allow the rays of light 37a, 37b, 37c, and 37d to form images on the image capture surface 27a of the image capture unit 27 to form spots 39a, 39b, 39c, and 39d, respectively. The image capture unit 27 captures images of the spots 39a, 39b, 39c, and 39d. The image capture unit 27 is a two-dimensional element array, which includes imaging elements arranged two-dimensionally, or a two-dimensional image sensor. The image capture unit 27 is exemplified by a CMOS (Complementary Metal Oxide Semiconductor) image sensor or a CCD (Charge Coupled Device) image sensor.

The image capture unit 27 captures the spots 39a, 39b, 39c, and 39d under the control of the signal processing unit 28.

The signal processing unit 28 calculates the distance from the detection target surface 9a by using the principle of triangulation and on the basis of the luminance centroid of each of the spots 39a, 39b, 39c, and 39d. The signal processing unit 28 is exemplified by a CPU (Central Processing Unit) or a DSP (Digital Signal Processor).

Figure 5:
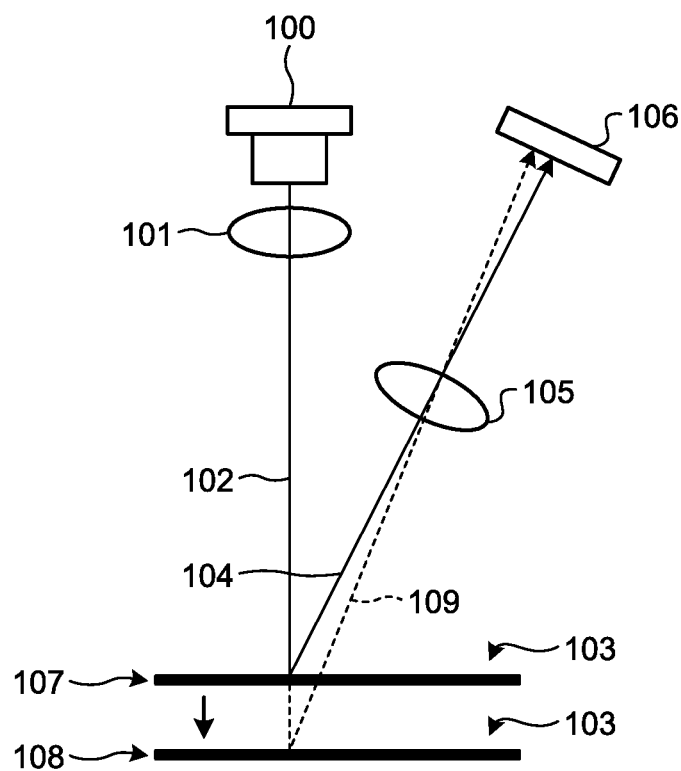
FIG. 5 is a diagram for describing a principle of triangulation in the displacement sensor according to the first embodiment.

FIG. 5 is a diagram for describing the principle of triangulation in the displacement sensor according to the first embodiment. A case in which a detection target surface 103 is located at a position 107 will now be described. Emitted light 102, which has been emitted by a light source 100 and passed through an objective lens 101, is diffusely reflected by the detection target surface 103. An image forming lens 105 allows reflected light 104 to form an image on a one-dimensional image sensor 106.

A case in which the detection target surface 103 is moved to a position 108, which is farther away from the light source 100 and the one-dimensional image sensor 106 than the position 107, will now be described. The emitted light 102, which has been emitted by the light source 100 and passed through the objective lens 101, is diffusely reflected by the detection target surface 103. The image forming lens 105 allows reflected light 109 to form an image on the one-dimensional image sensor 106. The reflected light 109 results from reflection at the position 108, which is farther away than the position 107, at which the reflected light 104 results from reflection; therefore, the position of a spot formed by the reflected light 109 on the one-dimensional image sensor 106 is closer to the light source 100 than the position of a spot formed by the reflected light 104 on the one-dimensional image sensor 106.

Figure 6:
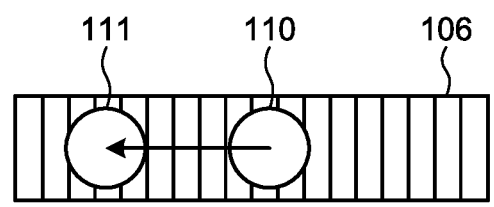
FIG. 6 is a diagram for describing the principle of triangulation in the displacement sensor according to the first embodiment.

FIG. 6 is a diagram for describing the principle of triangulation in the displacement sensor according to the first embodiment. As illustrated in FIG. 6, in the image capture surface of the one-dimensional image sensor 106, a spot 110, which is formed by the reflected light 104 when the detection target surface 103 is located at the position 107, is moved to a spot 111, which is formed by the reflected light 109 when the detection target surface 103 is moved to the position 108. The distance from the detection target surface 103 can be calculated by calculating the luminance centroid of each of the spots 110 and 111 and calculating the movement amount from the spot 110 to the spot 111.

The detection target object 9 is a member made from metal that is exemplified by a hard material, stainless steel, or copper. The detection target surface 9a of the detection target object 9 has minute protrusions and recesses, before machining, due to machining marks left when the detection target object 9 is cut out of a base material. That is, the surface of the detection target object 9 is a rough surface before the machining.

Figure 7:
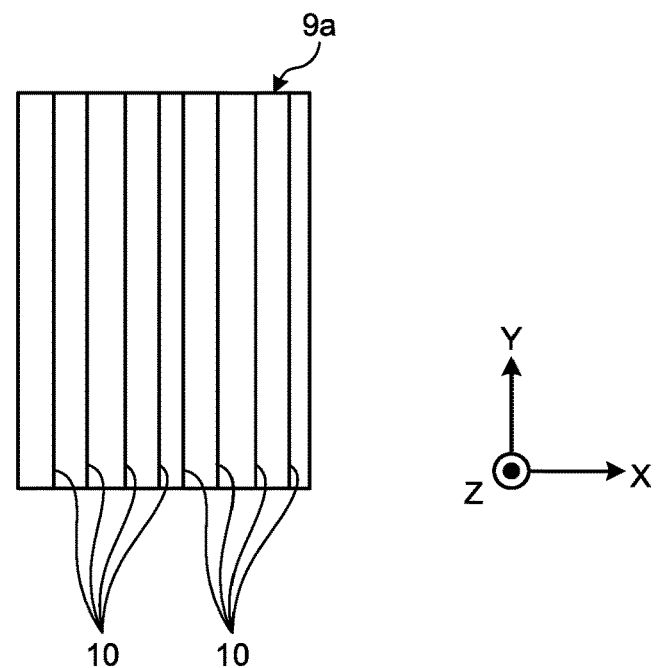
FIG. 7 is a diagram illustrating a detection target surface of a detection target object of the displacement sensor according to the first embodiment.

FIG. 7 is a diagram illustrating the detection target surface of the detection target object detected by the displacement sensor according to the first embodiment. FIG. 7 is a diagram illustrating the detection target surface 9a when viewed in the direction opposite to the Z direction. In the detection target surface 9a, machining marks 10, each of which extends along a first direction, are arranged with intervals in a second direction that intersects the first direction. The interval is exemplified by a value from 3 μm to 5 μm. In the first embodiment, the machining marks 10 each extend along the Y direction, which is the first direction, and are arranged with intervals of 3 μm to 5 μm in the X direction.

Thus, when the emitted light 35 illuminates the detection target surface 9a, the intensity distribution of the reflected light 36 with respect to the reflection angle varies depending on the position on the detection target surface 9a. Hence, the intensity distribution of the spots 39a, 39b, 39c, and 39d captured at the image capture unit 27 significantly varies depending on the positions on the detection target surface 9a, and thus, a stable luminance detection signal cannot be obtained, which results in variation. Accordingly, it is desirable that the diameter of the opening 20c1 formed in the projection aperture plate 20c be designed such that the diameter of a spot that illuminates the detection target surface 9a includes a plurality of protrusions and a plurality of recesses.

Ideally, a smaller diameter of a spot that illuminates the detection target surface 9a can result in smaller diameters of the spots 39a, 39b, 39c, and 39d and thus higher resolving power for height detection. However, in a case in which the detection target surface 9a has minute protrusions and recesses and the diameter of a spot that illuminates the detection target surface 9a is made excessively small, the intensity distribution of the reflected light 36 with respect to the reflection angle, which is an angle at which the emitted light 35 is reflected, is likely to vary depending on the illuminating position due to the influence of the protrusions and recesses and thus results in increased variation in luminance detection signal. For this reason, the diameter of a spot of the emitted light 35 that illuminates the detection target surface 9a needs to have an appropriate size such that the variation in luminance detection signal is reduced and the resolving power of the height detection is increased. In the case in which the intervals between the machining marks 10 are 3 μm to 5 μm, the diameter of the spot of the emitted light 35 that illuminates the detection target surface 9a is preferably 8 μm±1 μm and more preferably 8 μm. As described above, the diameter of the spot of the emitted light 35 that illuminates the detection target surface 9a can be adjusted by adjusting the diameter of the opening 20c1 of the projection aperture plate 20c.

Figure 8:
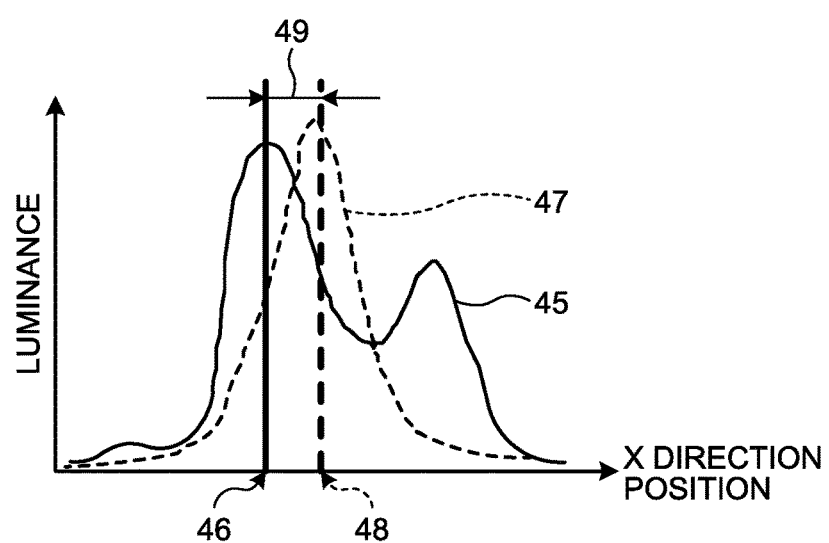
FIG. 8 is a diagram illustrating a luminance distribution of spots captured at the image capture unit of the displacement sensor according to the first embodiment.

FIG. 8 is a diagram illustrating a luminance distribution of spots captured at the image capture unit of the displacement sensor according to the first embodiment. FIG. 8 is a diagram illustrating the luminance distribution of the spots 39a and 39c captured at the image capture unit 27.

The positions of the spot 39a and the spot 39c are along the X direction, which intersects the Y direction, which is the direction in which the machining marks 10 extend. Thus, a luminance distribution 45 of the spot 39a and the spot 39c is likely to be affected by the machining marks 10. Accordingly, the luminance distribution 45 of the spots 39a and 39c has two peaks, indicating variation in comparison with a luminance distribution 47, which is ideal. Hence, a luminance centroid 46 of the luminance distribution 45 of the spots 39a and 39c has an error 49 relative to a luminance centroid 48 of the ideal luminance distribution 47 due to the machining marks 10.

Figure 9:
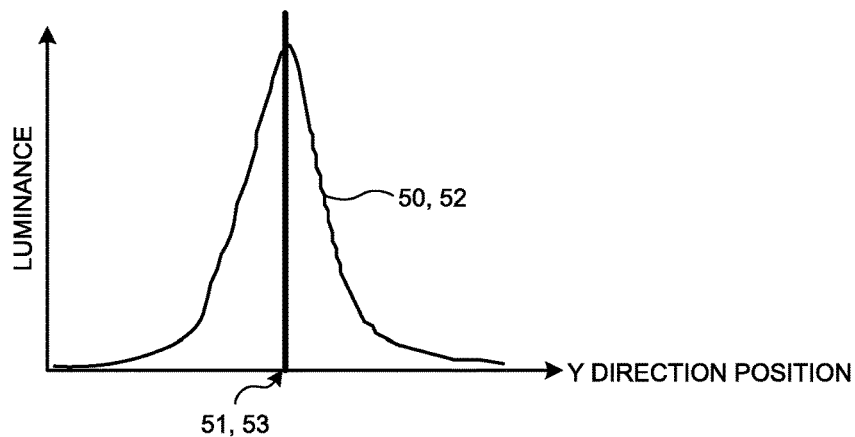
FIG. 9 is a diagram illustrating a luminance distribution of spots captured at the image capture unit of the displacement sensor according to the first embodiment.

FIG. 9 is a diagram illustrating a luminance distribution of spots captured at the image capture unit of the displacement sensor according to the first embodiment. FIG. 9 is a diagram illustrating the luminance distribution of the spots 39b and 39d captured at the image capture unit 27.

The positions of the spot 39b and the spot 39d are along the Y direction, which is the direction in which the machining marks 10 extend. Thus, a luminance distribution 50 of the spot 39b and the spot 39d is unlikely to be affected by the machining marks 10. Accordingly, the luminance distribution 50 of the spots 39b and 39d approximately agrees with a luminance distribution 52, which is ideal. Hence, a luminance centroid 51 of the luminance distribution 50 of the spots 39b and 39d approximately agrees with a luminance centroid 53 of the ideal luminance distribution 52.

The signal processing unit 28 calculates variation in luminance centroid position of each of the spots 39a, 39b, 39c, and 39d. The signal processing unit 28 selects one or more of the spots 39a, 39b, 39c, and 39d that have smaller variation in luminance centroid position and calculates the distance from the detection target surface 9a on the basis of the luminance centroid(s) of the selected spot(s). That is, the signal processing unit 28 selects one of the spots 39a, 39b, 39c, and 39d that has the smallest variation in luminance centroid position or selects some of the spots 39a, 39b, 39c, and 39d in the ascending order from the one having the smallest variation in luminance centroid position.

The signal processing unit 28 can select one or more of the spots 39a, 39b, 39c, and 39d that have the smaller standard deviation(s) of the luminance centroid positions. That is, the signal processing unit 28 can use the standard deviation of luminance centroid positions as a measure of the variation in luminance distribution.

Because the machining marks 10 extend in the Y direction in the first embodiment, the variation in luminance centroid position of the two spots 39b and 39d, which are located along the Y direction, is smaller than the variation in luminance centroid position of the other two spots 39a and 39c. Hence, the signal processing unit 28 selects two of the spots 39a, 39b, 39c, and 39d that have smaller variation in luminance centroid position, that is, the spot 39b having the smallest variation in luminance centroid position and the spot 39d having the next smallest variation in luminance centroid position, and calculates the distance from the detection target surface 9a on the basis of the luminance centroids of the selected spots 39b and 39d.

An exemplary method with which the height is calculated on the basis of the selected spots will now be described. The spots 39b and 39d, which have small variation in luminance centroid position, are less likely to be affected by the machining marks 10 than the spots 39a and 39c; however, the luminance centroid positions of the spots 39b and 39d may vary because the detection target surface 9a is a metal rough surface. The spots 39b and 39d appear at positions symmetrical about the reference axis 22 in the Y direction, and it is conceivable that the luminance distributions of the spots 39b and 39d appear in a similar manner. Accordingly, when a luminance centroid position Yb of the spot 39b in the Y direction varies by $\Delta Y$, a luminance centroid position Yd of the spot 39d in the Y direction also varies by $\Delta Y$. Thus, calculating the height from the difference between the luminance centroid positions of the spots 39b and 39d can cancel the variation $\Delta Y$ in luminance centroid position and thereby allow for calculation of the height with high accuracy.

In this manner, the signal processing unit 28 can select the two spots 39b and 39d, which have smaller variation in luminance centroid position, from the spots 39a, 39b, 39c, and 39d and calculate the distance from the detection target surface 9a on the basis of the luminance centroids of the selected spots 39b and 39d with high accuracy.

The displacement detection apparatus 1 can calculate the distance from the detection target surface 9a with high accuracy by performing the following processing.

Figure 10:
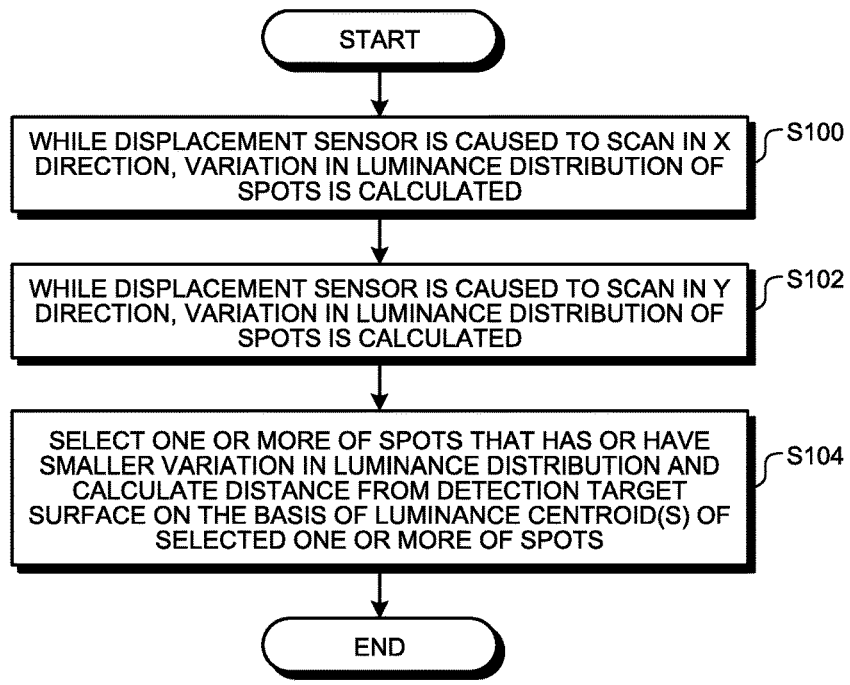
FIG. 10 is a flowchart illustrating processing of the displacement detection apparatus according to the first embodiment.

FIG. 10 is a flowchart illustrating processing of the displacement detection apparatus according to the first embodiment.

In step S100, the control unit 7 controls the drive unit 5 such that the displacement sensor 6 scans by a predetermined distance in the +X direction, and while doing so, the control unit 7 controls the signal processing unit 28 such that the image capture unit 27 captures each of the spots 39a, 39b, 39c, and 39d more than once under the control of the signal processing unit 28 and controls the signal processing unit 28 such that the variation in luminance centroid position of the spots 39a, 39b, 39c, and 39d is calculated.

Note that, while the displacement sensor 6 is caused to scan in the +X direction, the control unit 7 may control the signal processing unit 28 such that the image capture unit 27 captures each of the spots 39a, 39b, 39c, and 39d more than once under the control of the signal processing unit 28 and control the signal processing unit 28 such that the variation in luminance centroid position of each of the spots 39a, 39b, 39c, and 39d is calculated more than once.

Alternatively, the control unit 7 may cause the displacement sensor 6 to scan in the −X direction. Alternatively, the control unit 7 may control the drive unit 3 such that the scan unit 2 scans in the +X direction or in the −X direction, instead of controlling the drive unit 5 such that the displacement sensor 6 scans in the +X direction or the −X direction.

Then, in step S102, the control unit 7 controls the drive unit 5 such that the displacement sensor 6 scans by a predetermined distance in the +Y direction, and while doing so, the control unit 7 controls the signal processing unit 28 such that the image capture unit 27 captures each of the spots 39a, 39b, 39c, and 39d more than once under the control of the signal processing unit 28 and controls the signal processing unit 28 such that the variation in luminance centroid position of the spots 39a, 39b, 39c, and 39d is calculated.

Note that, while the displacement sensor 6 is caused to scan in the +Y direction, the control unit 7 may control the signal processing unit 28 such that the image capture unit 27 captures each of the spots 39a, 39b, 39c, and 39d more than once under the control of the signal processing unit 28 and control the signal processing unit 28 such that the variation in luminance centroid position of each of the spots 39a, 39b, 39c, and 39d is calculated more than once.

Alternatively, the control unit 7 may cause the displacement sensor 6 to scan in the −Y direction. Alternatively, the control unit 7 may control the drive unit 3 such that the scan unit 2 scans in the +Y direction or in the −Y direction, instead of controlling the drive unit 5 such that the displacement sensor 6 scans in the +Y direction or the −Y direction.

Then, in step S104, the control unit 7 controls the signal processing unit 28 such that the signal processing unit 28 selects one of the spots 39a, 39b, 39c, and 39d that has the smallest variation in luminance centroid position or selects some of the spots 39a, 39b, 39c, and 39d in the ascending order from the one having the smallest variation in luminance centroid position and that the signal processing unit 28 calculates the distance from the detection target surface 9a on the basis of the luminance centroid(s) of the luminance distribution of the selected one or more of the spots.

Because the machining marks 10 extend in the Y direction in the first embodiment, the variation in luminance centroid position of the spots 39b and 39d, whose positions are aligned in the Y direction, is smaller than the variation in luminance centroid position of the spots 39a and 39c, whose positions are aligned in the X direction. Hence, the signal processing unit 28 selects the two spots 39b and 39d, which have smaller variation in luminance centroid position, from the spots 39a, 39b, 39c, and 39d and calculates the distance from the detection target surface 9a on the basis of the luminance centroids of the selected spots 39b and 39d.

In this manner, the signal processing unit 28 can calculate the distance from the detection target surface 9a with high accuracy.

A case in which the displacement sensor 6 calculates the distance from the chamfer surface 9b will now be described.

The displacement sensor 6 has a focus that is adjusted on the detection target surface 9a; thus, in order to calculate the distance between the displacement sensor 6 and the chamfer surface 9b, it is necessary to adjust the detection target surface 9a such that the detection target surface 9a is within the depth of focus of the spot of the emitted light 35. In the first embodiment, the depth of focus is exemplified by a value from −50 μm to +50 μm, although this is not a limitation. The depth of focus varies depending on the specifications of the objective optical system 24 included in the displacement sensor 6.

Figure 11:
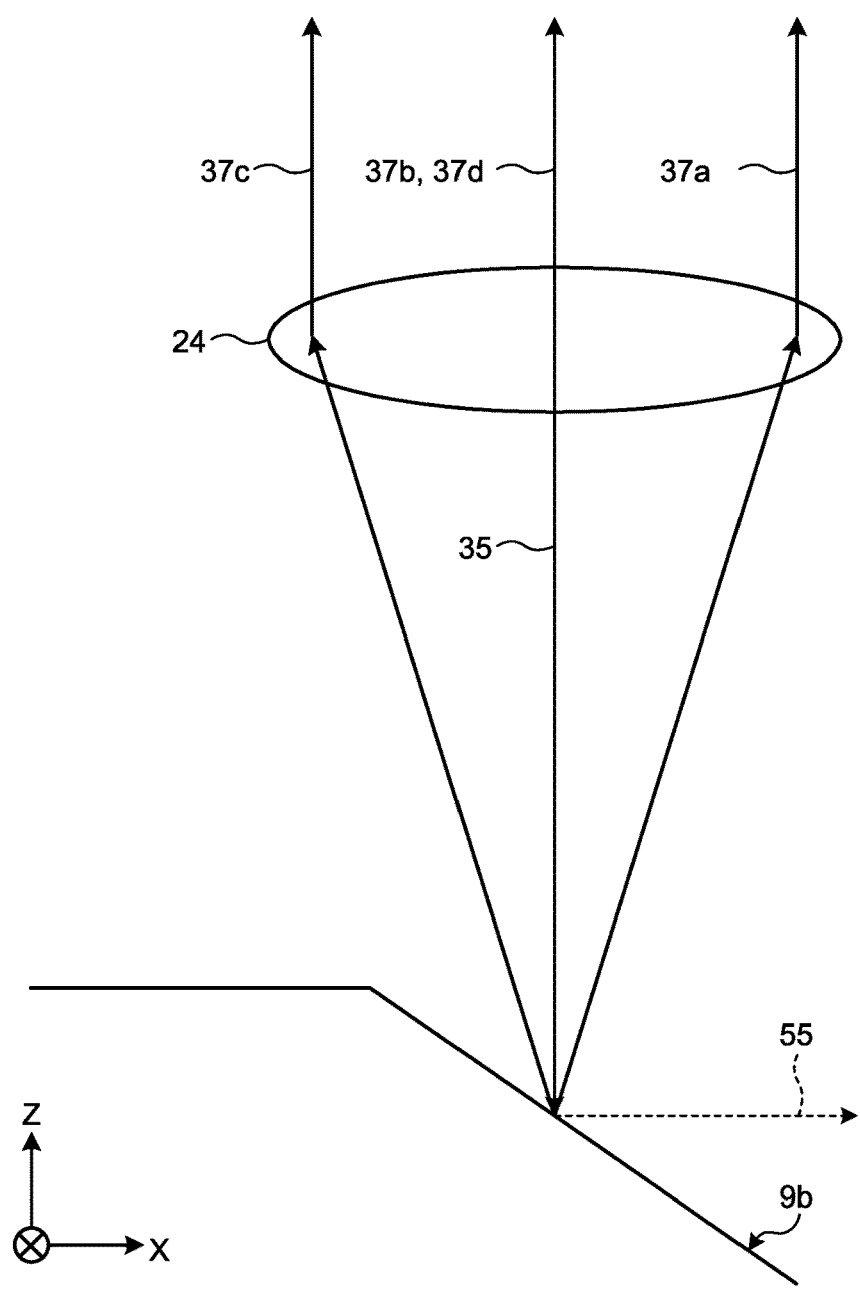
FIG. 11 is a diagram illustrating emitted light of the displacement sensor according to the first embodiment illuminating a chamfer surface.

FIG. 11 is a diagram illustrating the emitted light of the displacement sensor according to the first embodiment illuminating the chamfer surface. As illustrated in FIG. 11, in the case of the chamfer surface 9b, the traveling direction of specular reflection light 55 of the emitted light 35 is +X direction. Thus, the light intensities of the rays of light 37a, 37b, 37c, and 37d, which are portions of the parallel light 37, satisfy the ray of light 37a>the ray of light 37b and the ray of light 37d>the ray of light 37c; thus, the spots 39a, 39b, 39c, and 39d have differences in light intensity. In particular, almost no light is collected in the spot 39c, which results in a degraded S/N ratio (signal/noise ratio) for the spot 39c.

In a case in which the spots 39a and 39c are used, the signal processing unit 28 calculates the height between the displacement sensor 6 and the chamfer surface 9b on the basis of the movement amount of luminance centroid positions in the +X direction; thus, if the light intensity of the spot 39a is significantly different from the light intensity of the spot 39c, an error is likely to occur.

For the reason described above, the signal processing unit 28 can calculate the height between the displacement sensor 6 and the chamfer surface 9b with high accuracy by using the spots 39b and 39d. The signal processing unit 28 can determine the inclination direction of the chamfer surface 9b from the moving direction of the displacement sensor 6 or the detection target object 9 and, thus, can select a spot to be used for the calculation of the height from the spots 39a, 39b, 39c, and 39d.

In this manner, the displacement sensor 6 can calculate the distance between the displacement sensor 6 and the detection target surface 9a and, additionally, can calculate the height between the displacement sensor 6 and the chamfer surface 9b.

Note that the baffle plate 25 has the four openings 25a, 25b, 25c, and 25d in the first embodiment, although the number of the openings is not limited to four.

Figure 12:
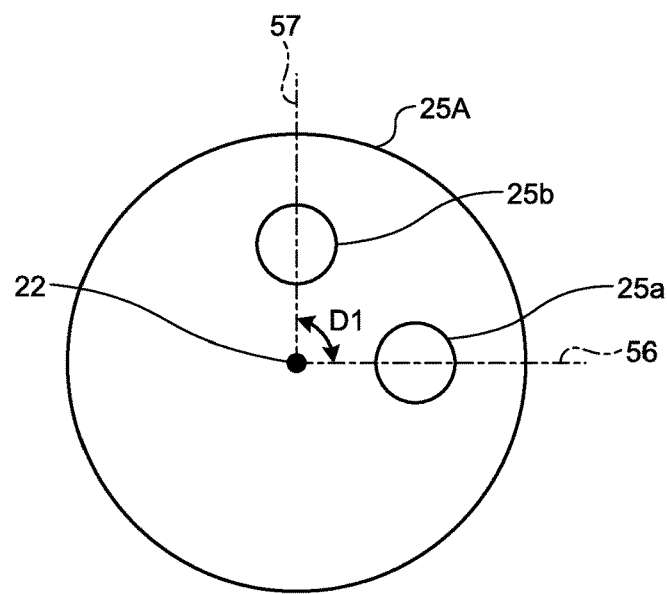
FIG. 12 is a diagram illustrating another exemplary baffle plate of the displacement sensor according to the first embodiment.

FIG. 12 is a diagram illustrating another exemplary baffle plate of the displacement sensor according to the first embodiment. A baffle plate 25A illustrated in FIG. 12 has two openings 25a and 25b. The distance between the displacement sensor 6 and the detection target surface 9a can be calculated with high accuracy when an angle D1 between a line 56, which connects the reference axis 22 and the center of the opening 25a, and a line 57, which connects the reference axis 22 and the center of the opening 25b, is 90 degrees, which is preferable. As the angle D1 is shifted further from 90 degrees, accuracy with which the displacement sensor 6 calculates the distance between the displacement sensor 6 and the detection target surface 9a is lowered. Thus, the angle D1 is preferably in the range from 80 degrees to 100 degrees, and more preferably in the range from 85 degrees to 95 degrees, and still more preferably in the range from 88 degrees to 92 degrees.

Figure 13:
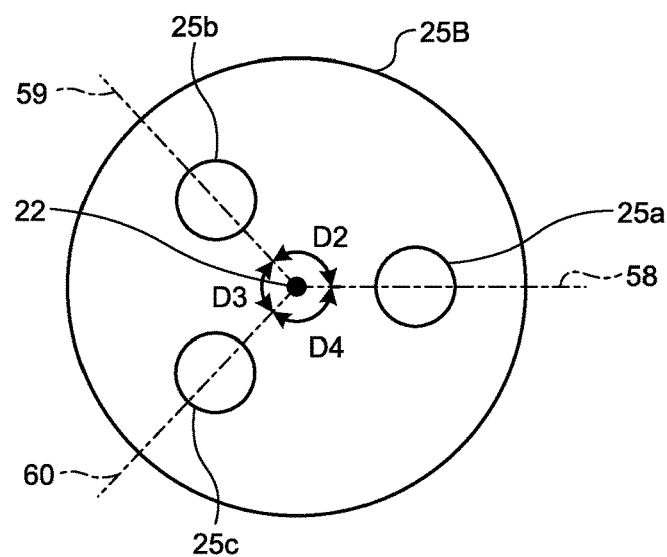
FIG. 13 is a diagram illustrating another exemplary baffle plate of the displacement sensor according to the first embodiment.

FIG. 13 is a diagram illustrating another exemplary baffle plate of the displacement sensor according to the first embodiment. A baffle plate 25B illustrated in FIG. 13 has three openings 25a, 25b, and 25c. The distance between the displacement sensor 6 and the detection target surface 9a can be calculated with high accuracy when an angle D2 between a line 58, which connects the reference axis 22 and the center of the opening 25a, and a line 59, which connects the reference axis 22 and the center of the opening 25b, an angle D3 between the line 59 and a line 60, which connects the reference axis 22 and the center of the opening 25c, and an angle D4 between the line 58 and the line 60 are 120 degrees, which is preferable.

Figure 26:
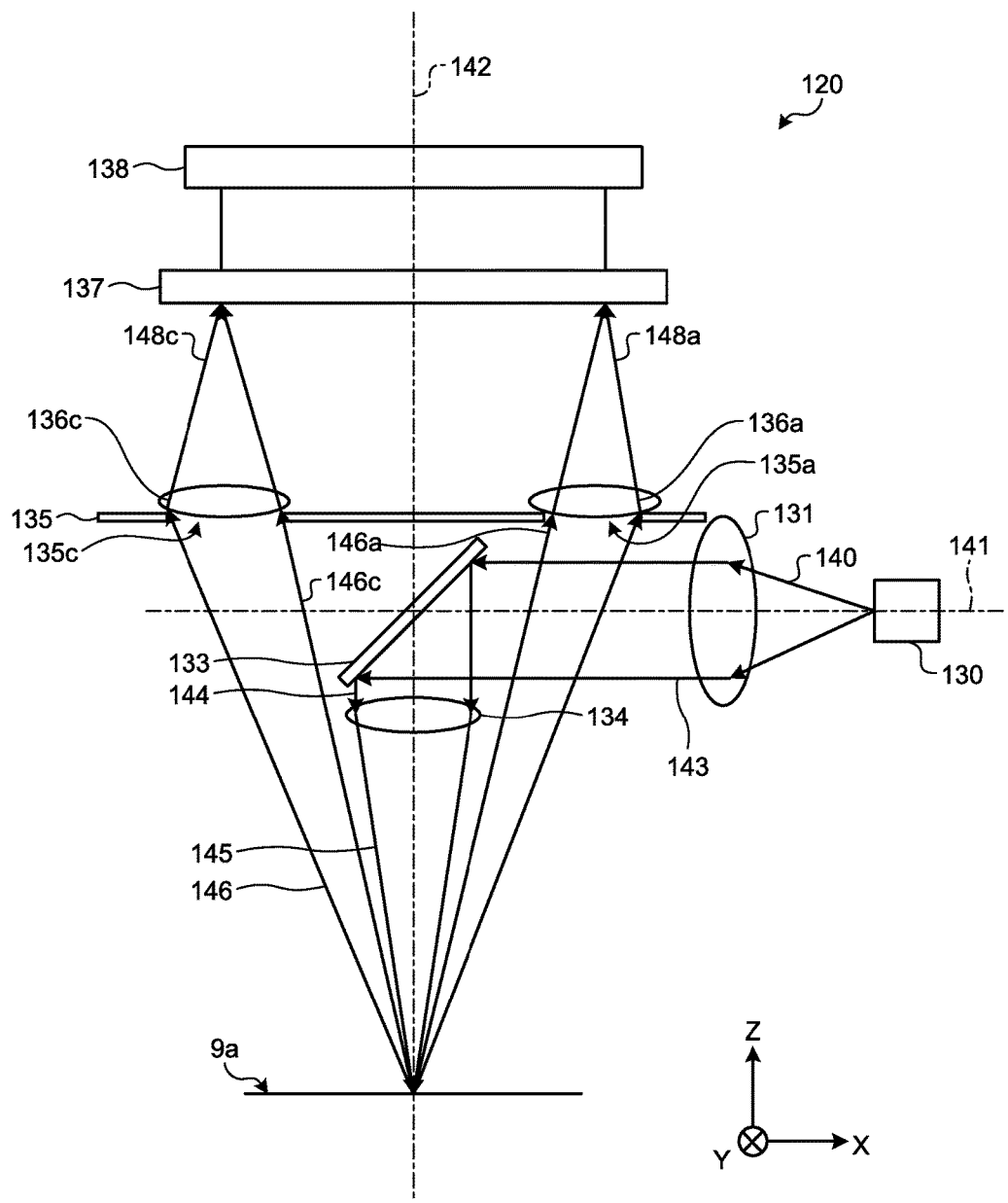
FIG. 26 is a diagram illustrating the configuration of a displacement sensor according to a comparative example.

FIG. 26 is a diagram illustrating the configuration of a displacement sensor according to a comparative example. A displacement sensor 120 includes a light source 130, which emits light 140. The optical axis of the light 140 is an axis 141, which extends along the X direction.

The light 140 is converted into parallel light 143 by a projection optical system 131. The parallel light 143 is reflected by a beam splitter 133 toward the detection target surface 9a. The optical axis of light 144, which results from the reflection by the beam splitter 133, is a reference axis 142, which extends along the Z direction. Emitted light 145, which results from convergence of the light 144 by an objective optical system 134 toward the detection target surface 9a, illuminates the detection target surface 9a.

The displacement sensor 120 includes a baffle plate 135 having openings 135a and 135c, which allow rays of light 146a and 146c, which are portions of reflected light 146 resulting from diffuse reflection of the emitted light 145 by the detection target surface 9a, to pass therethrough, respectively; an image capture unit 137, which captures an image; and image forming optical systems 136a and 136c, which allow rays of light 148a and 148c, which have passed through the openings 135a and 135c, to form images on the image capture unit 137.

The displacement sensor 120 also includes a signal processing unit 138, which calculates the distance from the detection target surface 9a on the basis of the luminance centroid of each of spots captured by the image capture unit 137.

Because the reflected light 146, which is not converted into parallel light, illuminates the baffle plate 135, the displacement sensor 120 according to the comparative example has increased widths in the X direction and the Y direction and thus an increased size. Additionally, the size of the image capture unit 137 is increased, and thus, the displacement sensor 120 increases costs.

In contrast, because the objective optical system 24 converts the reflected light 36 into the parallel light 37 as illustrated in FIG. 2, the displacement sensor 6 according to the first embodiment can reduce its width in the X direction and the Y direction and thus can reduce its size. Additionally, the size of the image capture unit 27 can be reduced, and thus, the displacement sensor 6 can reduce costs.

Second Embodiment

Figure 14:
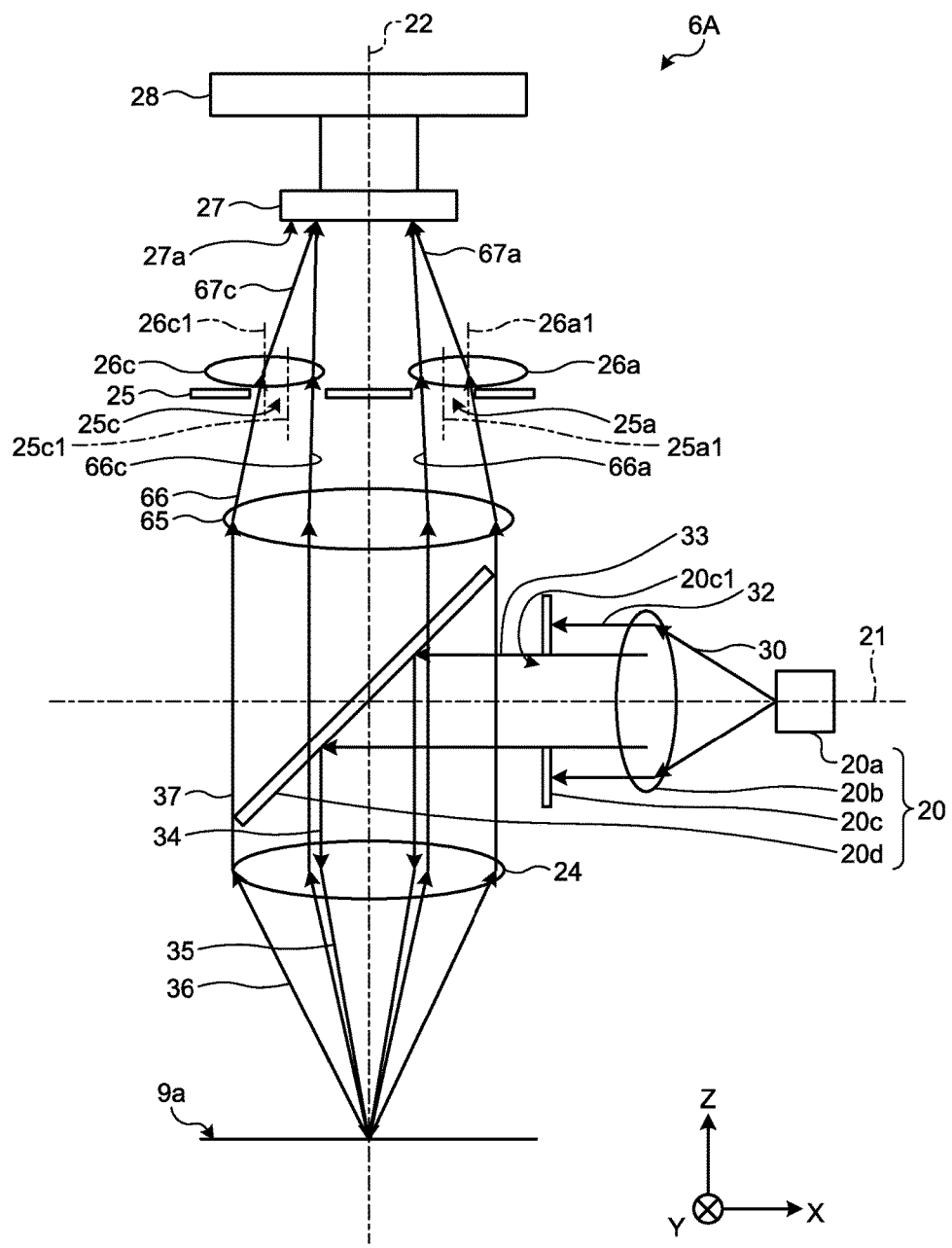
FIG. 14 is a diagram illustrating the configuration of a displacement sensor according to a second embodiment.

FIG. 14 is a diagram illustrating the configuration of a displacement sensor according to a second embodiment. FIG. 14 is a diagram illustrating the configuration of a displacement sensor 6A when viewed in the Y direction.

In addition to the components of the displacement sensor 6 according to the first embodiment, the displacement sensor 6A further includes a convergence optical system 65, which converges the parallel light 37 into converged light 66 and is disposed between the objective optical system 24 and the baffle plate 25. In the second embodiment, the convergence optical system 65 is one lens, although it may be a combination of lenses.

Because the convergence optical system 65 converges the parallel light 37 into the converged light 66 in this manner, the displacement sensor 6A can reduce its width in the X direction and the Y direction further in comparison with the displacement sensor 6 and thus can reduce its size further in comparison with the displacement sensor 6.

In the displacement sensor 6A, the image forming optical system 26a has the central axis 26a1, which is located farther from the reference axis 22 than the central axis 25a1 of the opening 25a. In the displacement sensor 6A, a portion 66a of the converged light 66 enters the image forming optical system 26a at its portion that is on the side of the reference axis 22 with reference to the central axis 26a1. Thus, the position at which a ray of image forming light 67a forms an image on the image capture surface of the image capture unit 27 is further closer to the reference axis 22 in comparison with the case of the displacement sensor 6.

Similarly, the image forming optical system 26c has the central axis 26c1, which is located farther from the reference axis 22 than the central axis 25c1 of the opening 25c. In the displacement sensor 6A, a portion 66c of the converged light 66 enters the image forming optical system 26c at its portion that is on the side of the reference axis 22 with reference to the central axis 26c1. Thus, the position at which a ray of image forming light 67c forms an image on the image capture surface of the image capture unit 27 is further closer to the reference axis 22 in comparison with the case of the displacement sensor 6.

Thus, the size of the image capture unit 27 can be reduced further in comparison with that in the displacement sensor 6, and thus, the displacement sensor 6A can reduce costs further in comparison with the displacement sensor 6.

Figure 15:
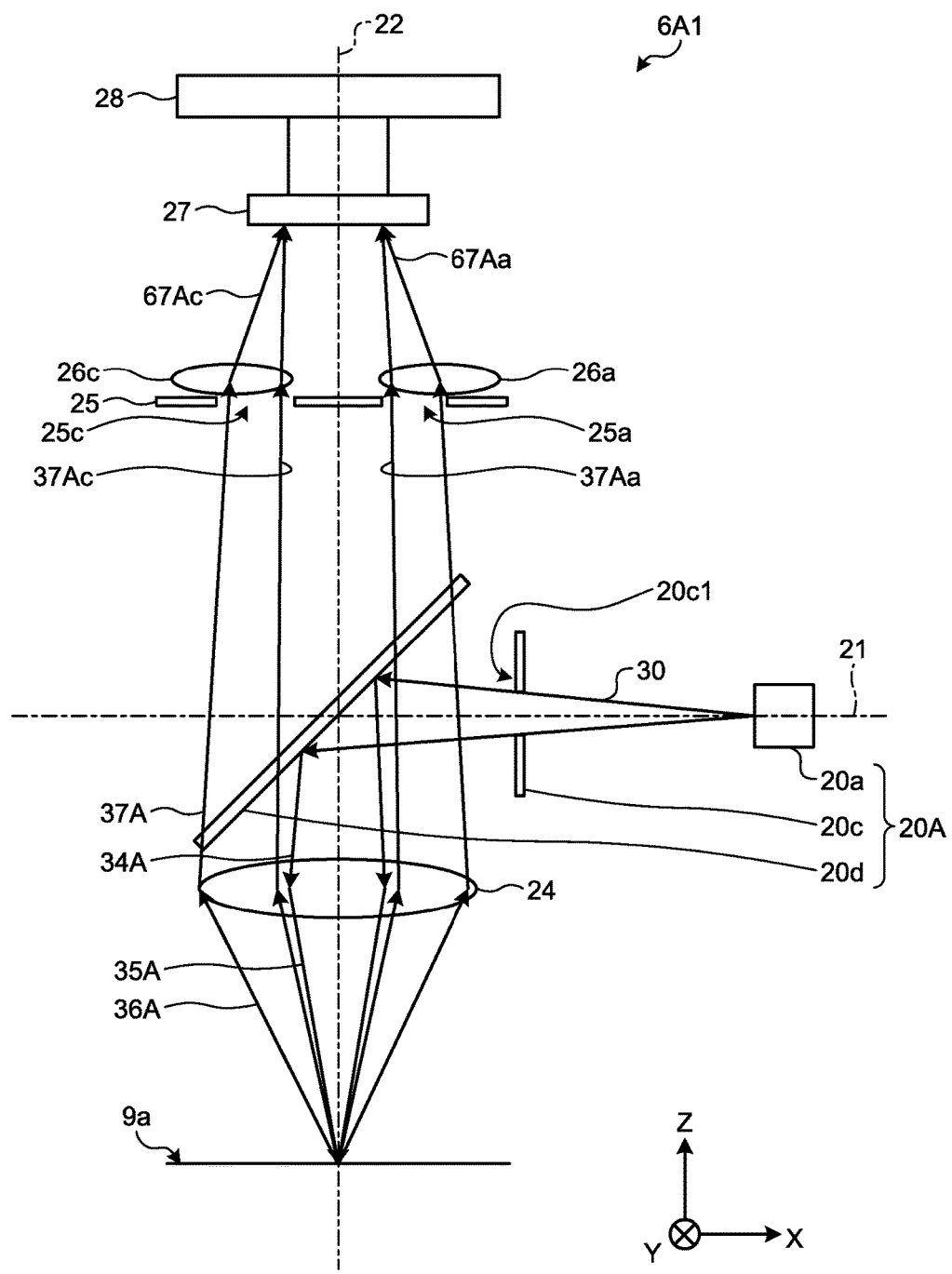
FIG. 15 is a diagram illustrating the configuration of a displacement sensor according to a modification of the second embodiment.

FIG. 15 is a diagram illustrating the configuration of a displacement sensor according to a modification of the second embodiment. FIG. 15 is a diagram illustrating the configuration of a displacement sensor 6A1 when viewed in the Y direction.

The displacement sensor 6A1 is different from the displacement sensor 6A in that the displacement sensor 6A1 excludes the projection optical system 20b and the convergence optical system 65.

In the displacement sensor 6A1, the light 30, which is emitted by the light source 20a, passes through the opening 20c1 while it is diverged. The beam splitter 20d reflects the light 30, which has passed through the opening 20c1, toward the detection target surface 9a. The optical axis of light 34A, which results from the reflection by the beam splitter 20d and travels toward the detection target surface 9a, is the reference axis 22, which extends along the Z direction.

The light 34A, which results from the reflection by the beam splitter 20d, enters the objective optical system 24 while it is diverged. Emitted light 35A, which results from the convergence of the light 34A by the objective optical system 24, illuminates the detection target surface 9a. The optical axis of the emitted light 35A is the reference axis 22. The emitted light 35A is diffusely reflected by the detection target surface 9a.

Reflected light 36A, which results from the diffuse reflection of the emitted light 35A by the detection target surface 9a, enters the objective optical system 24. The optical axis of the reflected light 36A is the reference axis 22. The objective optical system 24 converts the reflected light 36A into converged light 37A. The optical axis of the converged light 37A is the reference axis 22.

In this manner, the displacement sensor 6A1 can eliminate the projection optical system 20b and the convergence optical system 65. That is, the displacement sensor 6A1 can reduce the number of components. This allows the displacement sensor 6A1 to reduce costs.

Third Embodiment

Figure 16:
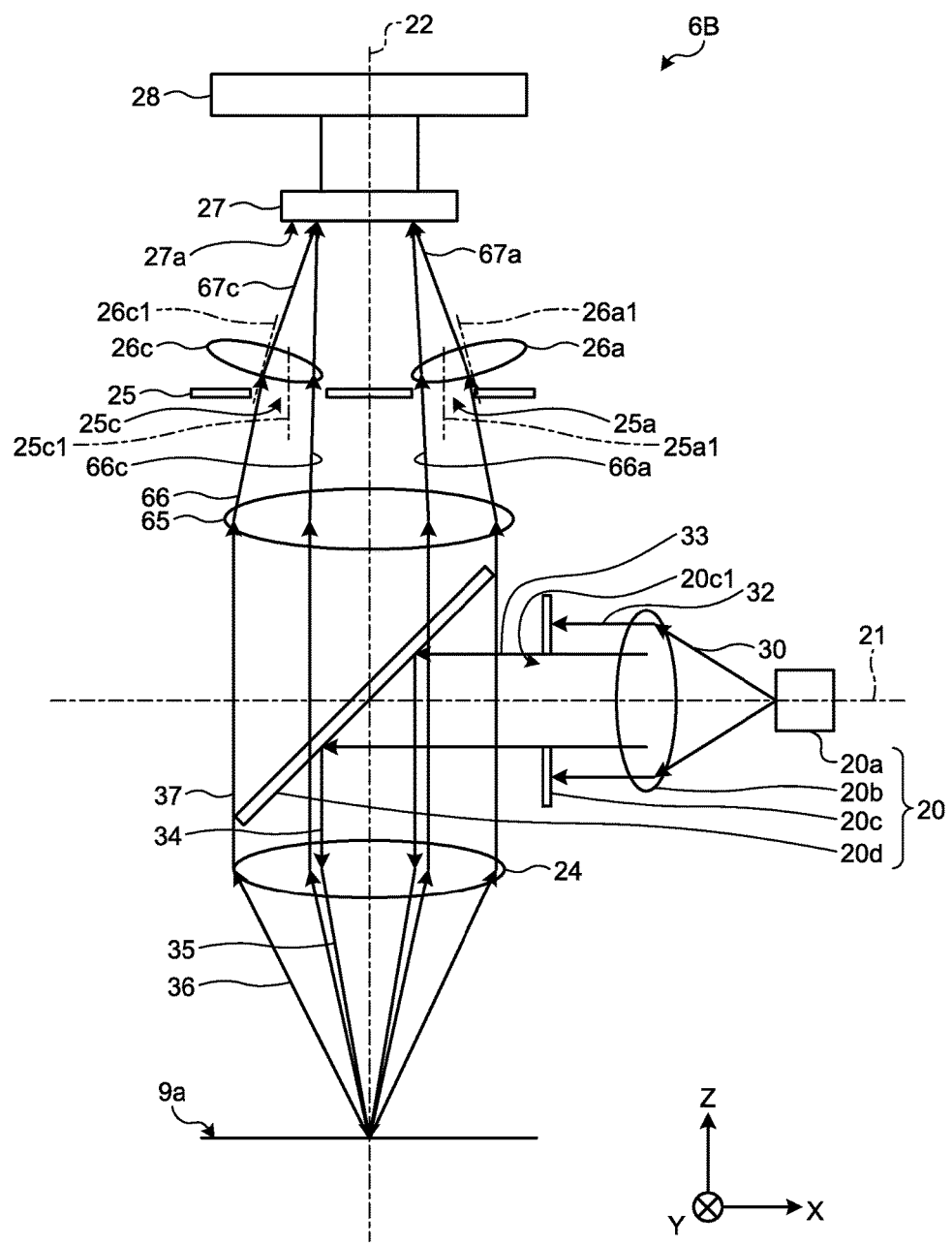
FIG. 16 is a diagram illustrating the configuration of a displacement sensor according to a third embodiment.

FIG. 16 is a diagram illustrating the configuration of a displacement sensor according to a third embodiment. FIG. 16 is a diagram illustrating the configuration of a displacement sensor 6B when viewed in the Y direction.

In comparison with the displacement sensor 6A according to the second embodiment, the image forming optical system 26a of the displacement sensor 6B has the central axis 26a1 that is tilted toward the reference axis 22.

Similarly, in comparison with the displacement sensor 6A according to the second embodiment, the image forming optical system 26c of the displacement sensor 6B has the central axis 26c1 that is tilted toward the reference axis 22.

Similarly, the image forming optical systems 26b and 26d of the displacement sensor 6B have the central axes 26b1 and 26d1 that are tilted toward the reference axis 22.

Figure 17:
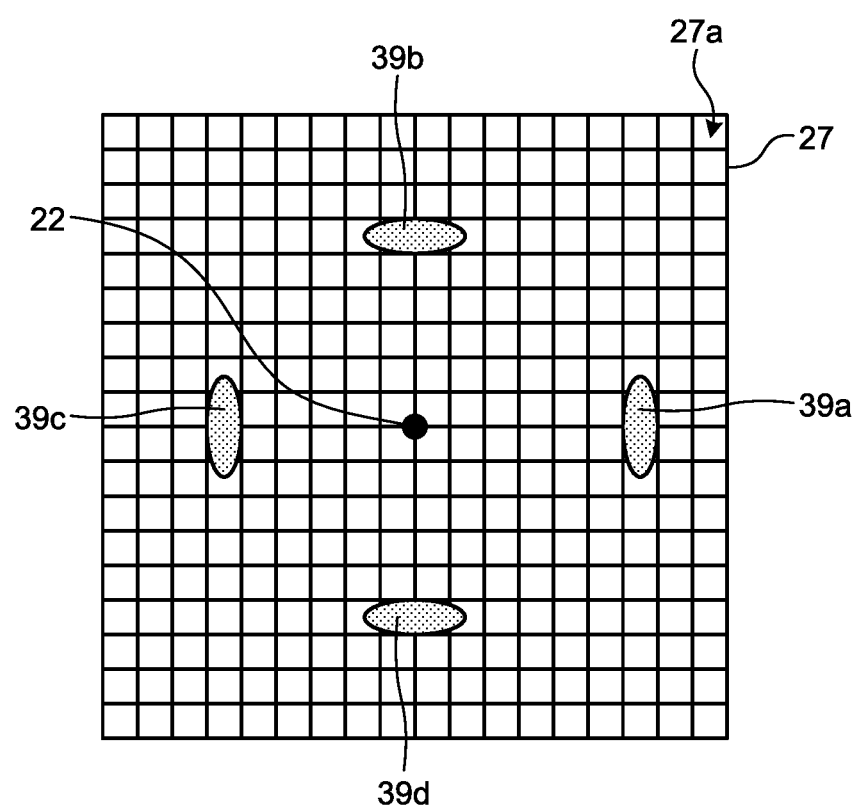
FIG. 17 is a diagram illustrating an image capture surface of an image capture unit of the displacement sensor according to the third embodiment.

FIG. 17 is a diagram illustrating the image capture surface of the image capture unit of the displacement sensor according to the third embodiment. FIG. 17 is a diagram illustrating the image capture surface of the image capture unit 27 when viewed in the Z direction.

Because the image forming optical system 26a of the displacement sensor 6B is placed with the central axis 26a1 tilted toward the reference axis 22, the diameter of the spot 39a in the direction along a line connecting the reference axis 22 and the spot 39a is smaller than the diameter of the spot 39a in the direction intersecting the line connecting the reference axis 22 and the spot 39a. The spot 39a moves along the line connecting the reference axis 22 and the spot 39a as the distance between the displacement sensor 6B and the detection target surface 9a changes. That is, the displacement sensor 6B can reduce the diameter of the spot 39a in the direction that is along the moving direction of the spot 39a.

In this manner, the displacement sensor 6B can calculate the luminance centroid of the spot 39a with further higher accuracy than the displacement sensor 6A.

Similarly, because the image forming optical systems 26b, 26c, and 26d of the displacement sensor 6B are placed with their central axes tilted toward the reference axis 22, each of the diameters of the spots 39b, 39c, and 39d in the directions along the lines connecting the reference axis 22 and the spots 39b, 39c, and 39d is smaller than a corresponding one of the diameters of the spots 39b, 39c, and 39d in the directions intersecting the lines connecting the reference axis 22 and the spots 39b, 39c, and 39d. Each of the spots 39b, 39c, and 39d moves along a corresponding one of the lines connecting the reference axis 22 and the spots 39b, 39c, and 39d as the distance between the displacement sensor 6B and the detection target surface 9a changes. That is, the displacement sensor 6B can reduce each of the diameters of the spots 39b, 39c, and 39d in the direction that is along the moving direction of a corresponding one of the spots 39b, 39c, and 39d.

In this manner, the displacement sensor 6B can calculate the luminance centroids of the spots 39b, 39c, and 39d with further higher accuracy than the displacement sensor 6A.

Thus, the displacement sensor 6B can calculate the luminance centroids of the spots 39a, 39b, 39c, and 39d with further higher accuracy than the displacement sensor 6A. In this manner, the displacement sensor 6B can calculate the distance between the displacement sensor 6B and the detection target surface 9a with further higher accuracy than the displacement sensor 6A.

Fourth Embodiment

Figure 18:
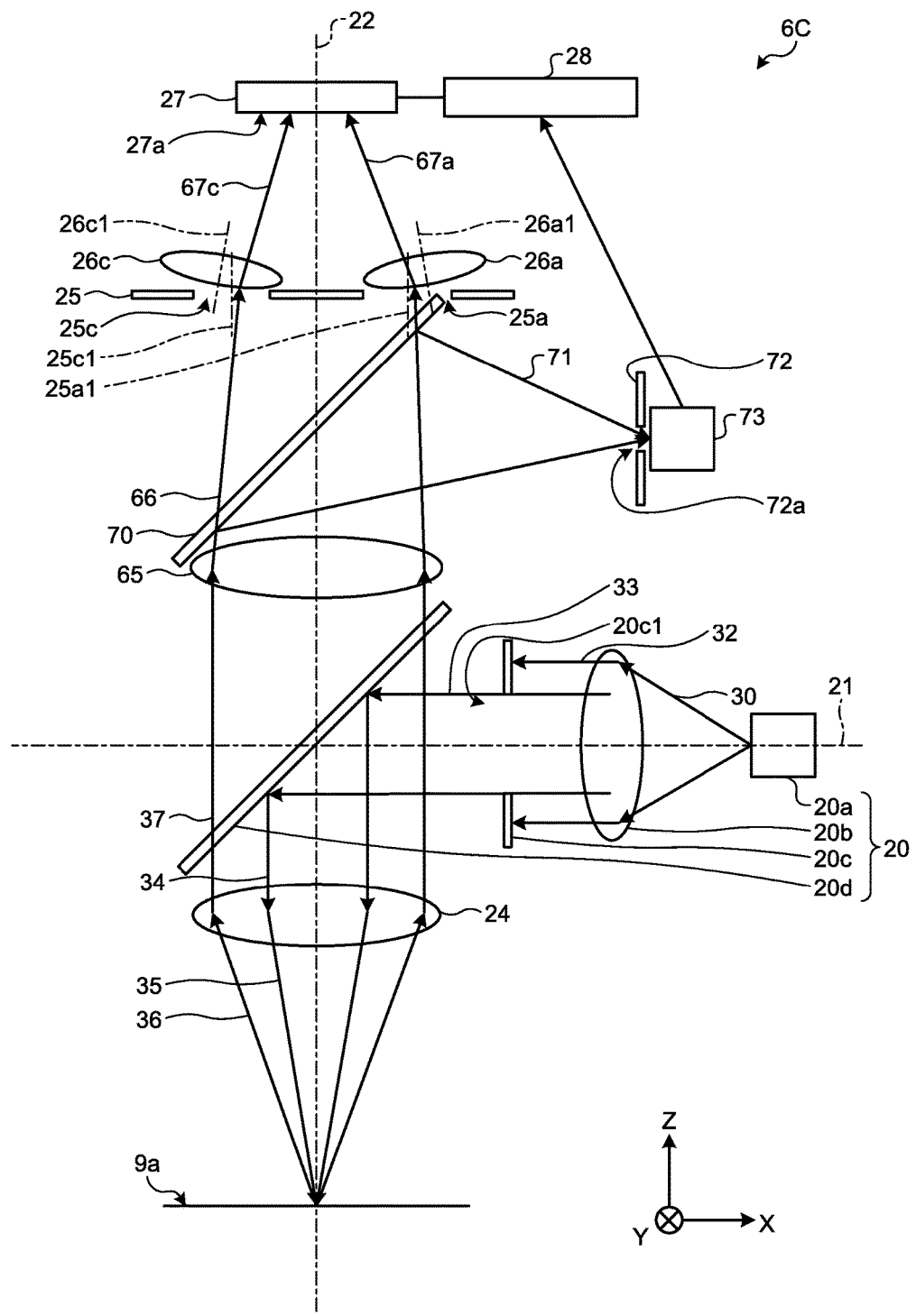
FIG. 18 is a diagram illustrating the configuration of a displacement sensor according to a fourth embodiment.

FIG. 18 is a diagram illustrating the configuration of a displacement sensor according to a fourth embodiment. FIG. 18 is a diagram illustrating the configuration of a displacement sensor 6C when viewed in the Y direction.

In addition to the components of the displacement sensor 6B according to the third embodiment, the displacement sensor 6C further includes, between the convergence optical system 65 and the baffle plate 25, a beam splitter 70, which reflects toward the X direction a component of the converged light 66 that deflects perpendicularly to an X-Z plane, a baffle plate 72 having a pinhole 72a, which allows reflected light 71 resulting from the reflection by the beam splitter 70 to pass therethrough, and a light intensity detection unit 73, which detects the light intensity of the light that has passed through the pinhole 72a. The light intensity detection unit 73 is exemplified by a photodiode.

The signal processing unit 28 can calculate an approximate distance between the displacement sensor 6C and the detection target surface 9a on the basis of the light intensity detected by the light intensity detection unit 73.

Figure 19:
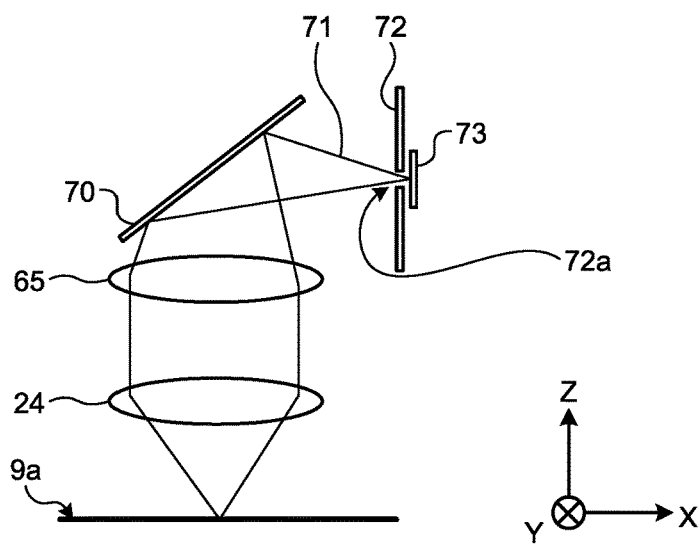
FIG. 19 is a diagram for describing a principle for calculating an approximate distance between the displacement sensor according to the fourth embodiment and a detection target surface.
Figure 20:
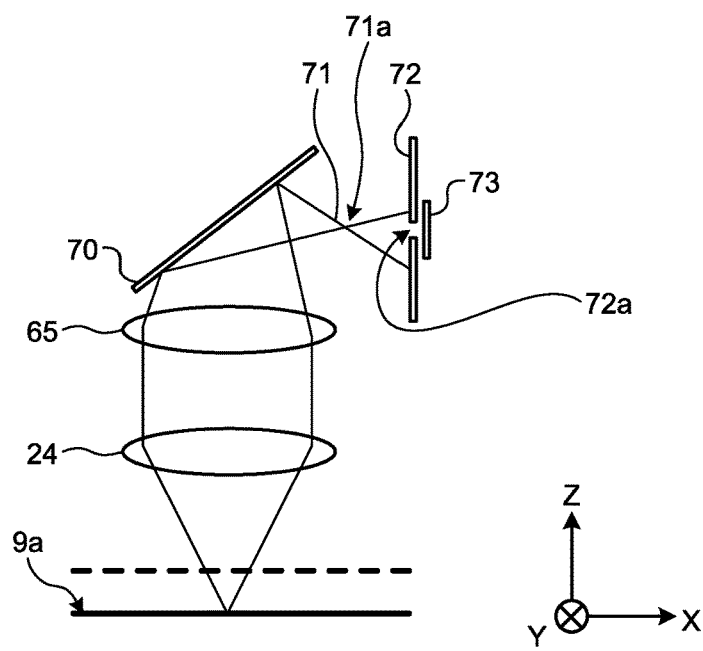
FIG. 20 is a diagram for describing the principle for calculating the approximate distance between the displacement sensor according to the fourth embodiment and the detection target surface.
Figure 21:
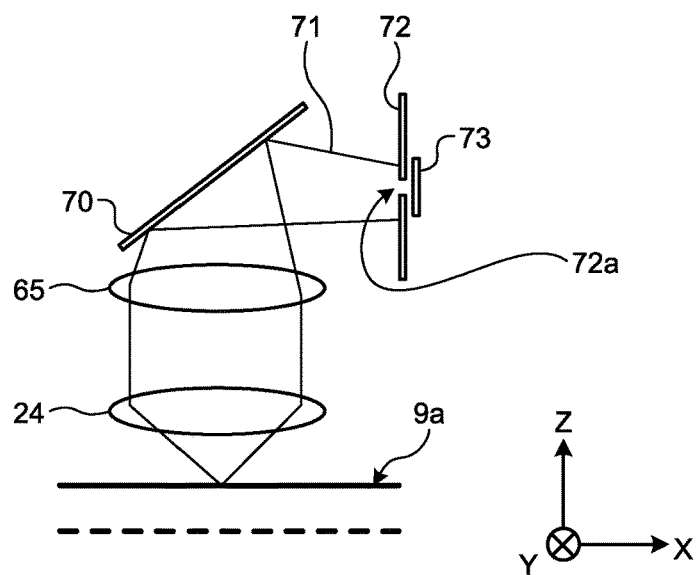
FIG. 21 is a diagram for describing the principle for calculating the approximate distance between the displacement sensor according to the fourth embodiment and the detection target surface.

FIG. 19 to FIG. 21 are diagrams for describing a principle for calculating an approximate distance between the displacement sensor according to the fourth embodiment and the detection target surface.

FIG. 19 is a diagram illustrating a case in which the detection target surface 9a is at a focal position of the objective optical system 24. In this case, the reflected light 71 is brought to a focus on a light intensity detection surface of the light intensity detection unit 73. Thus, the entire reflected light 71 passes through the pinhole 72a and is detected by the light intensity detection unit 73.

FIG. 20 is a diagram illustrating a case in which the detection target surface 9a is farther away from displacement sensor 6C than the focal position of the objective optical system 24. In this case, the reflected light 71 converges at a convergent point 71a and then diffuses before illuminating the baffle plate 72. Thus, a part of the reflected light 71 passes through the pinhole 72a and is detected by the light intensity detection unit 73.

FIG. 21 is a diagram illustrating a case in which the detection target surface 9a is closer to the displacement sensor 6C than the focal position of the objective optical system 24. In this case, the reflected light 71 illuminates the baffle plate 72 before complete convergence. Thus, a part of the reflected light 71 passes through the pinhole 72a and is detected by the light intensity detection unit 73.

Figure 22:
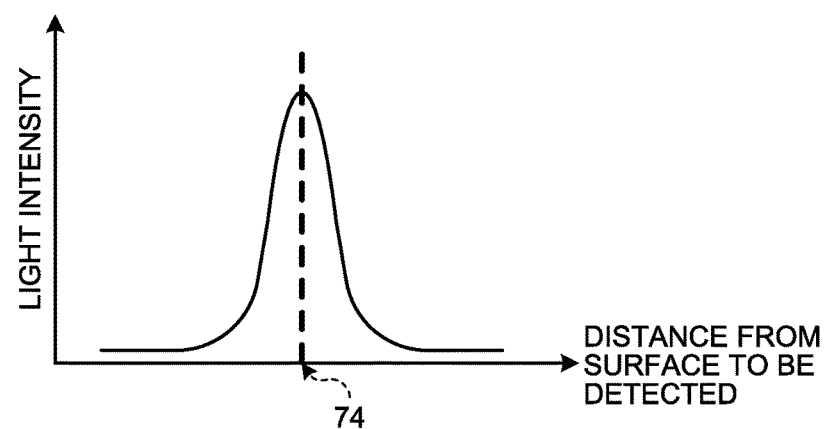
FIG. 22 is a diagram illustrating a relationship between the distance between an objective optical system of the displacement sensor according to the fourth embodiment and the detection target surface and the light intensity detected by a light intensity detection unit.

FIG. 22 is a diagram illustrating a relationship between the distance between the objective optical system of the displacement sensor according to the fourth embodiment and the detection target surface and the light intensity detected by the light intensity detection unit.

As described above, when the detection target surface 9a is at a focal position 74 of the objective optical system 24, the light intensity detected by the light intensity detection unit 73 achieves a maximum.

That is, when the light intensity detected by the light intensity detection unit 73 has achieved the maximum, the signal processing unit 28 can approximately determine that the distance between the displacement sensor 6C and the detection target surface 9a is the distance defined by the focal length of the objective optical system 24. Thus, when the light intensity detected by the light intensity detection unit 73 has achieved the maximum, the signal processing unit 28 can determine that the detection target surface 9a is within the depth of focus of the spot of the emitted light 35.

Then, the signal processing unit 28 can go on to cause the image capture unit 27 to capture images of the spots 39a, 39b, 39c, and 39d and calculate the distance between the displacement sensor 6C and the detection target surface 9a on the basis of the luminance centroids of the spots 39a, 39b, 39c, and 39d. In this manner, the signal processing unit 28 can calculate the distance between the displacement sensor 6C and the detection target surface 9a swiftly.

The light intensity detection unit 73, which detects the light intensity, can operate at a higher speed than the image capture unit 27, which captures images of the spots 39a, 39b, 39c, and 39d. Thus, the displacement sensor 6C can approximately determine that the distance between the displacement sensor 6C and the detection target surface 9a is the distance defined by the focal length of the objective optical system 24 at a higher speed than the displacement sensor 6B.

In the calculation of the distance between the displacement sensor 6C and the detection target surface 9a on the basis of the luminance centroids of the spots 39a, 39b, 39c, and 39d captured by the image capture unit 27, it is desirable that the detection target surface 9a be within the depth of focus of the spot of the emitted light 35. In contrast, in the calculation of the distance between the displacement sensor 6C and the detection target surface 9a on the basis of the light intensity detected by the light intensity detection unit 73, the distance can be calculated in a range wider than the depth of focus described above. Thus, the displacement sensor 6C can calculate the distance between the displacement sensor 6C and the detection target surface 9a in a wide range.

Note that the baffle plate 72 is not indispensable, although including the baffle plate 72 can enhance the accuracy with which the maximum of the light intensity of the reflected light 71 is detected and thus is preferable.

Figure 23:
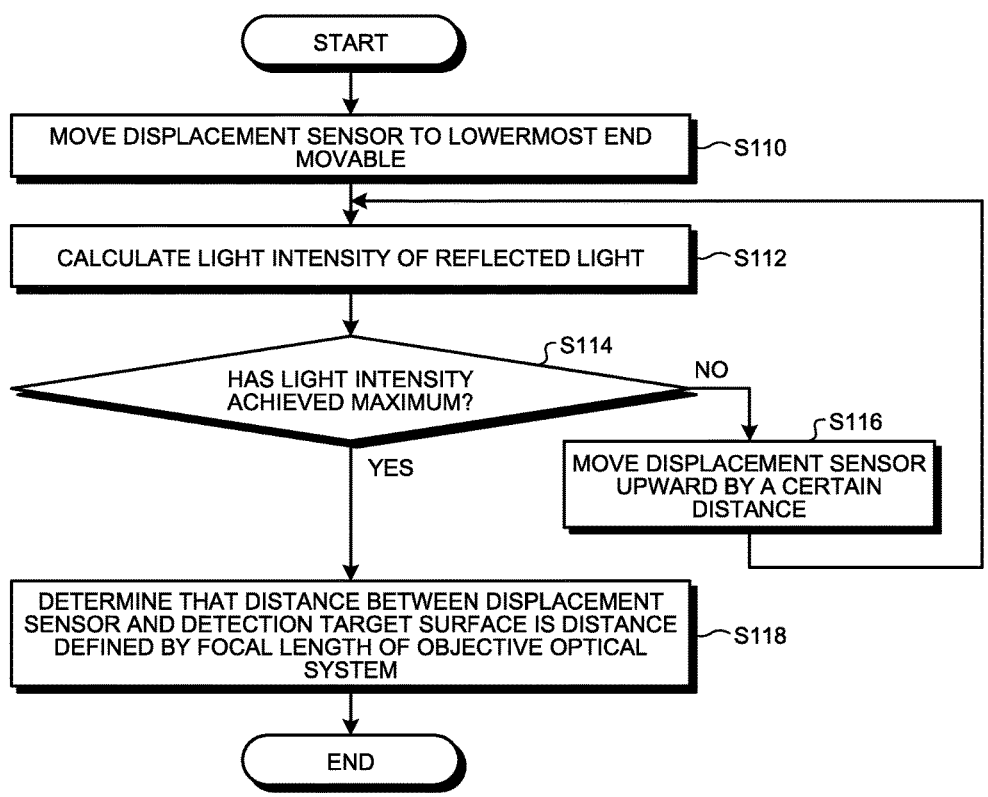
FIG. 23 is a flowchart illustrating processing of the displacement detection apparatus according to the fourth embodiment.

FIG. 23 is a flowchart illustrating processing of the displacement detection apparatus according to the fourth embodiment.

The control unit 7 controls the drive unit 5 in step S110 such that the displacement sensor 6C is moved to the lowermost end movable in the Z direction. The control unit 7 may control the drive unit 5 such that the displacement sensor 6C is moved to the uppermost end movable in the Z direction.

Instead of controlling the drive unit 5 such that the displacement sensor 6C is moved in the Z direction, the control unit 7 may control the drive unit 3 such that the scan unit 2 is moved in the Z direction.

Then, the control unit 7 controls the signal processing unit 28 in step S112 such that the light intensity of the reflected light 71 is calculated.

Then, the control unit 7 determines in step S114 whether or not the light intensity of the reflected light 71 has achieved the maximum.

If it is determined in step S114 that the light intensity of the reflected light 71 has not achieved the maximum (No), the control unit 7 controls the drive unit 5 in step S116 such that the displacement sensor 6C is moved upward, that is, in the Z direction by a predetermined distance and proceeds with processing in step S112. The control unit 7 may control the drive unit 5 such that the displacement sensor 6C is moved downward, that is, in the −Z direction by a predetermined distance.

If it is determined in step S114 that the light intensity of the reflected light 71 has achieved the maximum (Yes), the control unit 7 determines in step S118 that the distance between the displacement sensor 6C and the detection target surface 9a is the distance defined by the focal length of the objective optical system 24 and ends the processing.

In this manner, the displacement detection apparatus 1 can adjust the detection target surface 9a such that the detection target surface 9a is within the depth of focus of the spot of the emitted light 35. In a case in which a distance measuring position is, for example, at the chamfer surface 9b, the displacement detection apparatus 1 can also adjust the detection target surface 9a such that the detection target surface 9a is within the depth of focus of the spot of the emitted light 35 by performing the processing in FIG. 23.

Thus, the displacement detection apparatus 1 can go on to cause the image capture unit 27 to capture images of the spots 39a, 39b, 39c, and 39d and calculate the distance between the displacement sensor 6C and the detection target surface 9a on the basis of the luminance centroids of the spots 39a, 39b, 39c, and 39d. In this manner, the displacement detection apparatus 1 can calculate the distance between the displacement sensor 6C and the detection target surface 9a swiftly.

A case in which the chamfer surface 9b is formed in the detection target object 9 is described above. In a case in which the chamfer surface 9b is not formed in the detection target object 9, the displacement sensor 6C can also detect the edge position of the detection target object 9. The control unit 7 controls the drive unit 5 such that the displacement sensor 6C is moved so as to cross over the edge and the light intensity detection unit 73 receives reflected light from the detection target object at this time.

Figure 24:
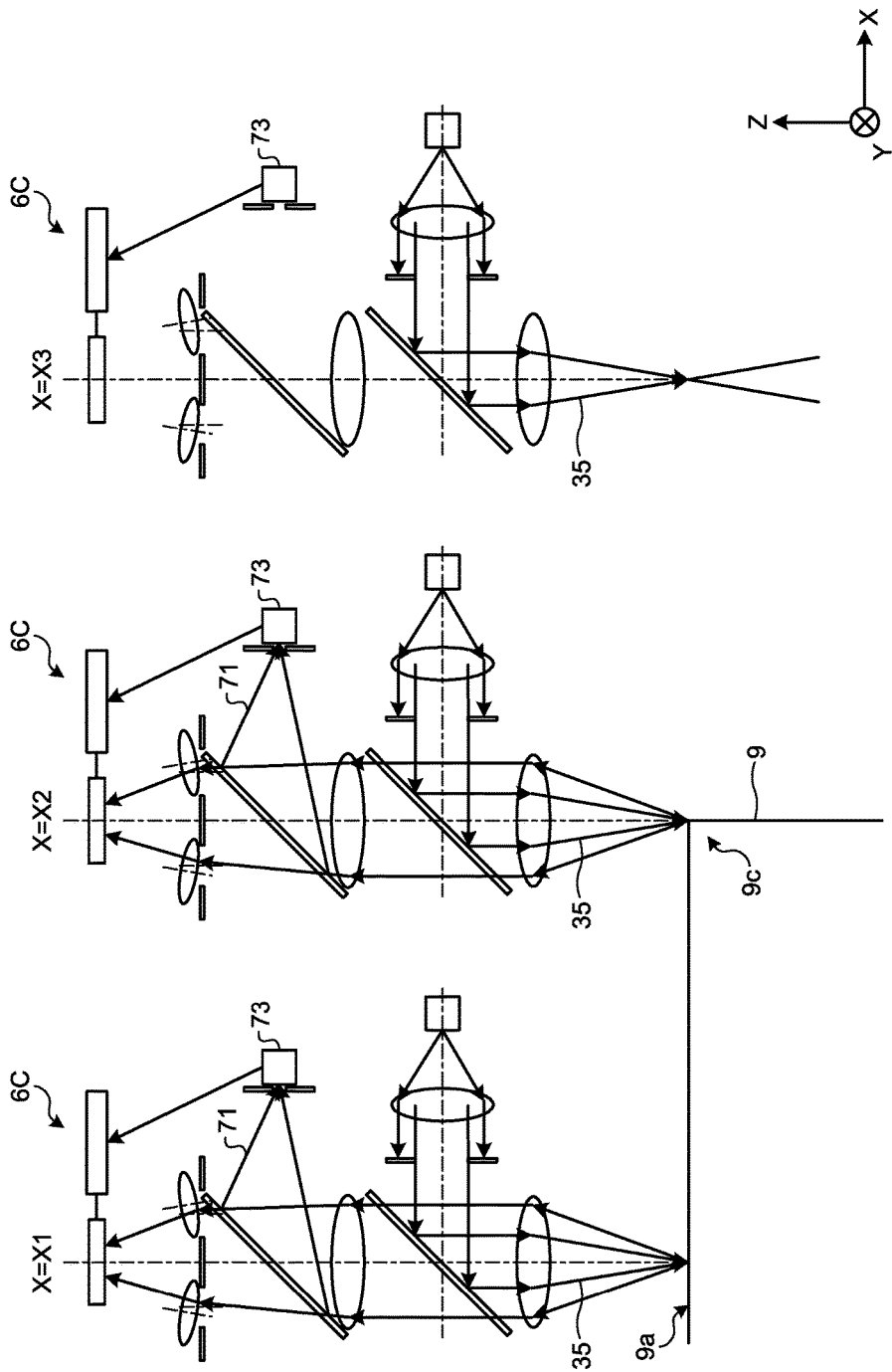
FIG. 24 is a diagram illustrating an edge of a detection target object being detected by the displacement sensor according to the fourth embodiment.

FIG. 24 is a diagram illustrating an edge of a detection target object being detected by the displacement sensor according to the fourth embodiment. As illustrated in FIG. 24, the detection target object 9 does not have the chamfer surface 9b formed therein and has an edge 9c.

When the displacement sensor 6C is located over the detection target surface 9a and the X coordinate is X1, roughly all of the emitted light 35 is reflected and the reflected light 71 enters the light intensity detection unit 73.

When the displacement sensor 6C is located over the edge 9c of the detection target object 9 and the X coordinate is X2, roughly half of the emitted light 35 is reflected and the reflected light 71 enters the light intensity detection unit 73.

When the displacement sensor 6C is located at a place not over the detection target object 9 and the X coordinate is X3, all of the emitted light 35 is not reflected and the reflected light 71 does not enter the light intensity detection unit 73.

Figure 25:
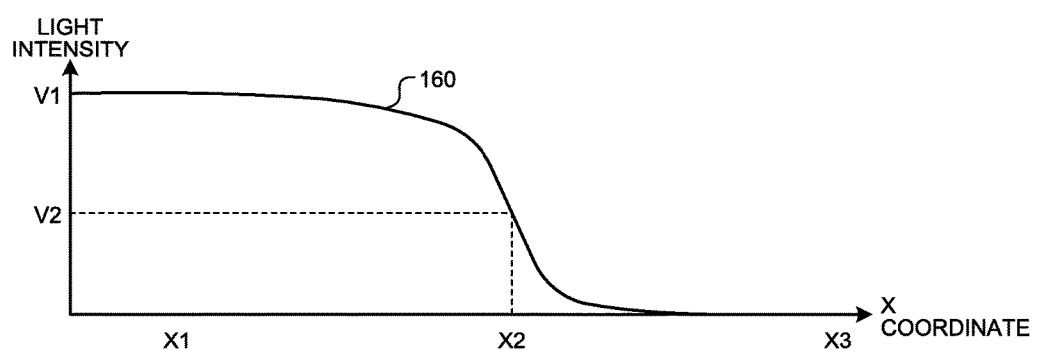
FIG. 25 is a diagram illustrating a relationship between an X coordinate of the displacement sensor according to the fourth embodiment and the detected light intensity.

FIG. 25 is a diagram illustrating a relationship between the X coordinate of the displacement sensor according to the fourth embodiment and the detected light intensity. As illustrated in FIG. 25, a graph 160, which indicates the relationship between the X coordinate of the displacement sensor 6C and the detected light intensity, remains to be in the vicinity of a maximum light intensity V1 when the X coordinate is in the vicinity of X1, reaches a light intensity V2, which is half of the maximum light intensity V1, when the X coordinate is in the vicinity of X2, and reaches zero when the X coordinate is in the vicinity of X3.

Thus, the displacement sensor 6C can also detect the position of the edge 9c of the detection target object 9 on the basis of the change in light intensity detected by the light intensity detection unit 73.

Note that the configurations described in the foregoing embodiments are examples of the content of the present invention, and combining the present invention with other publicly known techniques is possible and partial omissions and modifications are possible without departing from the spirit of the present invention.

Reference Signs List 1 displacement detection apparatus, 2 scan unit, 3, 5 drive unit, 6 displacement sensor, 7 control unit, projection unit, 24 objective optical system, 25, 72 baffle plate, 26a, 26b, 26c, 26d image forming optical system, 27 image capture unit, 28 signal processing unit, 65 convergence optical system, 70 beam splitter, 73 light intensity detection unit.

The invention claimed is:

1. A displacement sensor comprising:
   a projection unit to project emitted light toward a detection target surface of a detection target object, the projection unit including a light source emitting light and an optical element reflecting light emitted from the light source toward the detection target surface;
   an objective optical system to converge the emitted light toward the detection target surface, admit reflected light resulting from diffuse reflection of the emitted light by the detection target surface, and convert the reflected light into parallel light or converged light;
   an image capture unit to capture an image;
   at least one baffle plate having a plurality of openings and located farther from the objective optical system than the optical element;
   a plurality of image forming optical systems to allow each of a plurality of rays of transmitted light that results from the reflected light admitted by the objective optical system and that has passed through one of the openings formed in the baffle plate to form an image on the image capture unit; and
   a signal processing unit to calculate a distance from the detection target surface on a basis of a luminance centroid of each of a plurality of spots captured by the image capture unit, wherein an angle formed by a plane including an optical axis of one of the rays of transmitted light and a central axis of the objective optical system and a plane including an optical axis of another of the rays of transmitted light and the central axis of the objective optical system is from 80 degrees to 100 degrees when the number of the rays of transmitted light is two, the angle is 120 degrees when the number of the rays of transmitted light is three, or the angle is 90 degrees when the number of the rays of transmitted light is four.

2. The displacement sensor according to claim 1, wherein central axes of the image forming optical systems are located closer to an optical axis of transmitted light resulting from admission by the objective optical system than central axes of the openings.

3. The displacement sensor according to claim 1, wherein the signal processing unit selects one or more of the spots that have smaller variation in luminance distribution and calculates the distance from the detection target surface on a basis of a luminance centroid of the selected one or more of the spots.

4. The displacement sensor according to claim 1, wherein the signal processing unit selects, from the spots, two spots located along a direction that a machining mark of the detection target surface extends and calculates the distance from the detection target surface on a basis of luminance centroids of the selected spots.

5. The displacement sensor according to claim 1, further comprising a convergence optical system to converge transmitted light resulting from admission by the objective optical system, the convergence optical system being disposed between the objective optical system and the baffle plate.

6. The displacement sensor according to claim 5, wherein central axes of the image forming optical systems are located farther from an optical axis of the transmitted light resulting from the admission by the objective optical system than central axes of the openings.

7. The displacement sensor according to claim 1, wherein central axes of the image forming optical systems are tilted toward an optical axis of transmitted light resulting from admission by the objective optical system.

8. The displacement sensor according to claim 1, further comprising a light intensity detection unit to detect a light intensity of reflected light admitted by the objective optical system, wherein when the light intensity detected by the light intensity detection unit achieves a maximum value, the signal processing unit determines that a distance between the displacement sensor and the detection target surface is a distance defined by a focal length of the objective optical system.

9. The displacement sensor according to claim 1, wherein there are only two of said openings in said baffle plate, and said angle is from 80 degrees to 100 degrees.

10. The displacement sensor according to claim 1, wherein the central axis of each said image forming optical system is offset relative to a central axis of one of said openings from which said each image forming optical system receives light.

11. A displacement sensor comprising:

a projection unit to project emitted light toward a detection target surface of a detection target object;

an objective optical system to converge the emitted light toward the detection target surface, admit reflected light resulting from diffuse reflection of the emitted light by the detection target surface, and convert the reflected light into parallel light or converged light;

an image capture unit to capture an image;

a plurality of image forming optical systems to allow each of a plurality of rays of transmitted light that has passed through a corresponding one of the image forming optical systems to form an image on the image capture unit; and a signal processing unit to calculate a distance from the detection target surface on a basis of a luminance centroid of each of a plurality of spots captured by the image capture unit, wherein an angle formed by a plane including an optical axis of one of the rays of transmitted light and a central axis of the objective optical system and a plane including an optical axis of another of the rays of transmitted light and the central axis of the objective optical system is from 80 degrees to 100 degrees when the number of the rays of transmitted light is two, the angle is 120 degrees when the number of the rays of transmitted light is three, or the angle is 90 degrees when the number of the rays of transmitted light is four.

12. The displacement sensor according to claim 11, wherein there are only two of said openings in said baffle plate, and said angle is from 80 degrees to 100 degrees.

13. The displacement sensor according to claim 11, wherein the central axis of each said image forming optical system is offset relative to a central axis of one of said openings from which said each image forming optical system receives light.

* * * * *